United States Patent
Matono et al.

(10) Patent No.: US 7,293,345 B2
(45) Date of Patent: Nov. 13, 2007

(54) METHOD OF MANUFACTURING A THIN FILM MAGNETIC RECORDING HEAD

(75) Inventors: Naoto Matono, Saku (JP); Tatsuya Harada, Tokyo (JP); Shigeru Shoji, Tokyo (JP)

(73) Assignees: TDK Corporation, Tokyo (JP); SAE Magnetics (H.K.) Ltd., Hong Kong (HK)

( * ) Notice: Subject to any disclaimer, the term of this patent is extended or adjusted under 35 U.S.C. 154(b) by 446 days.

(21) Appl. No.: 10/996,466

(22) Filed: Nov. 26, 2004

(65) Prior Publication Data

US 2005/0117251 A1    Jun. 2, 2005

(30) Foreign Application Priority Data

Nov. 28, 2003    (JP) .............................. 2003-399909

(51) Int. Cl.
*G11B 5/187* (2006.01)
*B44C 1/22* (2006.01)

(52) U.S. Cl. .............................. 29/603.13; 29/603.12; 29/603.23; 216/39; 216/66; 216/94; 216/22; 204/192.34; 360/122; 360/125

(58) Field of Classification Search ............. 29/603.12, 29/603.07, 603.13, 603.14, 603.23; 216/22, 216/39, 48, 66, 72, 94; 204/192.34; 360/122, 360/125
See application file for complete search history.

(56) References Cited

U.S. PATENT DOCUMENTS 6,813,116 B2 *  11/2004  Nakamura et al. .......... 360/125

2003/0112555 A1    6/2003  Sato et al.
2003/0151850 A1    8/2003  Nakamura et al.

FOREIGN PATENT DOCUMENTS

| JP | 58-123711 | * | 7/1983 | .................. 216/22 |
| JP | A 60-133516 | | 7/1985 | |
| JP | A 2001-323394 | | 11/2001 | |
| JP | A 2003-142422 | | 5/2003 | |
| JP | 2003-242607 A | | 8/2003 | |
| JP | 2003-242608 A | | 8/2003 | |

OTHER PUBLICATIONS

Jayasekara et al., "A Reactive Ion Milling Process for Patterning Narrow Track Iron Nitride Recording Head Ples at the Wafer Level", IEEE Transactions on Magnetics, vol. 33, No. 5, Sep. 1997, pp. 2830-2832.*

* cited by examiner

*Primary Examiner*—A. Dexter Tugbang
(74) *Attorney, Agent, or Firm*—Oliff & Berridge, PLC

(57) ABSTRACT

A invention provides a method of manufacturing a thin film magnetic head is provided, capable of forming a magnetic pole layer as easily as possible. By etching a lower insulating layer and the upper insulating layer by RIE using a fluorine-based gas ($CF_4$ or $CHF_3$) or chlorine-based gas ($Cl_2$ or $BCl_3$), a magnetic pole formation space R1 is formed so as to have a uniform width in an upper insulating layer by and a magnetic pole formation space R2 is formed in the lower insulating layer so as to have a width gradually narrowed from width W1 to width W4 with distance from the magnetic pole formation space R1. After that, a plating film is grown in the magnetic pole formation spaces R1 and R2, thereby forming a main magnetic pole layer.

13 Claims, 15 Drawing Sheets

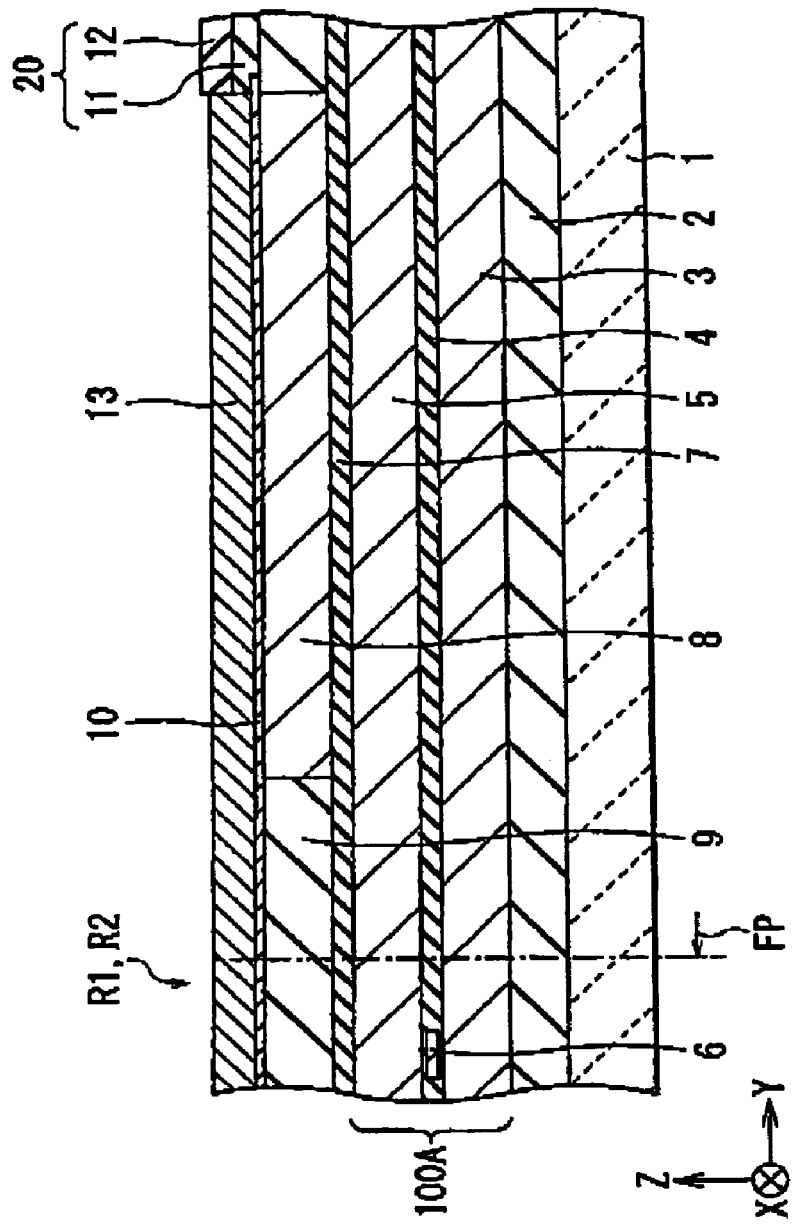
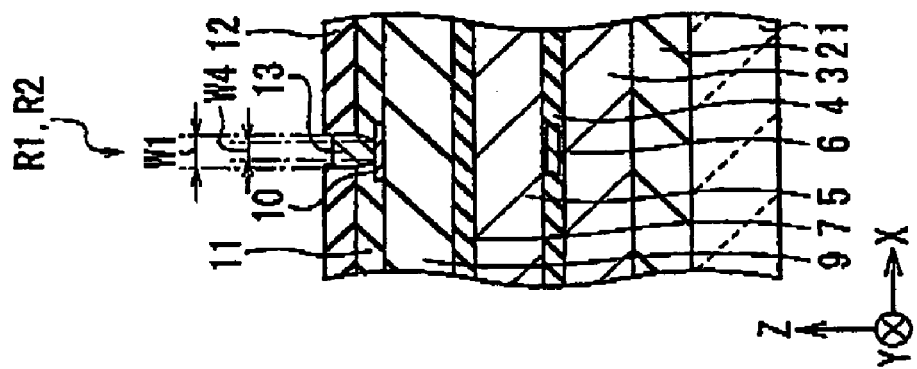
FIG. 14B
FIG. 14A

METHOD OF MANUFACTURING A THIN FILM MAGNETIC RECORDING HEAD

BACKGROUND OF THE INVENTION

1. Field of the Invention

The present invention relates to a thin film magnetic head having at least an inductive magnetic transducer for recording, a method of manufacturing the same, and a magnetic recording apparatus on which the thin film magnetic head is mounted.

2. Description of the Related Art

In recent years, in association with improvement in areal density of a magnetic recording medium (for example, a hard disk), improvement in performance of a thin film magnetic head to be mounted on a magnetic recording apparatus (for example, a hard disk drive) is demanded. Known recording methods of a thin film magnetic head are, for example, a longitudinal recording method in which the orientation of a signal magnetic field is set to an in-plane direction (longitudinal direction) of a hard disk and a perpendicular recording method in which the orientation of a signal magnetic field is set to a direction orthogonal to the surface of a hard disk. At present, the longitudinal recording method is widely used. However, when a market trend accompanying improvement in surface recording density of a hard disk is considered, it is assumed that, in place of the longitudinal recording method, the perpendicular recording method will be regarded as a promising method in the future for the following reason. The perpendicular recording method has advantages such that high linear recording density can be assured and a recorded hard disk is not easily influenced by thermal fluctuations.

A thin film magnetic head of the perpendicular recording method has a thin film coil for generating a magnetic flux and a magnetic pole layer for executing recording process by emitting the magnetic flux generated by the thin film coil toward a hard disk. The magnetic pole layer has an exposed face (hereinbelow, called "magnetic pole end face") exposed to the air bearing surface. The magnetic pole end face has, for example, a rectangular shape. In the thin film magnetic head, when current flows in the thin film coil, the magnetic flux for recording is generated in the thin film coil. When the magnetic flux is emitted from the magnetic pole layer toward a hard disk, the hard disk is magnetized by the magnetic field (perpendicular magnetic field) for recording which is generated on the basis of the magnetic flux, so that information is magnetically recorded on the hard disk. At this time, a recording pattern is determined on the basis of the trailing edge as a substantial recording part in the magnetic pole layer, that is, the edge on the trailing side of the magnetic pole end face, and information is written into the hard disk along the recording pattern. Consequently, the recording track width at the time of recording information onto a hard disk is specified on the basis of the width of the trailing edge.

To improve recording performance of the thin film magnetic head of the perpendicular recording method, or example, it is necessary to suppress the influence of a problem caused by a skew in the thin film magnetic head as much as possible. The skew is a phenomenon that the thin film magnetic head is inclined with respect to the swing of the arm of a hard disk during operation of a hard disk drive. In the case where the magnetic pole end face of the magnetic pole layer has a rectangular shape, when the thin film magnetic head skews, the recording pattern becomes more likely to be enlarged or to be distorted due to the shape. If information is recorded on a hard disk in a state where the recording pattern is enlarged or distorted, a crosstalk occurs at the time of reproducing the information, and the error rate increases, that is, the recording performance deteriorates.

Hitherto, some techniques regarding the configuration of a thin film magnetic head and a method; of manufacturing the thin film magnetic head capable of suppressing enlargement or distortion of a recording pattern due to the skew have been already proposed.

Concretely, for example, there is a known method of forming an insulating layer so as to have an inverted-trapezoid-shaped trench by using the etching technique or lift-off technique and, after that, forming the magnetic pole layer in the trench of the insulating layer in order to form a magnetic pole layer whose magnetic pole end face has an inverted-trapezoid shape in place of the rectangular shape refer to, for example, Japanese Patent Laid-open No. 2002-197613). In the case of using the etching technique in the method, after an insulating layer is formed, the insulating layer is selectively etched by using a mask, thereby forming a trench having an inverted trapezoid shape in the insulating layer. On the other hand, in the: case of using the lift-off method, a mask for liftoff is formed, an insulating layer is formed so as to cover the mask and the periphery of the mask, and the mask is lifted off, thereby forming the insulating layer having an inverted-trapezoid-shaped trench.

As the shape of the magnetic pole end face of the magnetic pole layer, except for the inverted trapezoid shape, a shape obtained by combining a rectangle rectangular region) and an inverted trapezoid (inverted-trapezoid region) is also known. Concretely, a hexagonal shape in which the width of the rectangular region and the maximum width of the inverted-trapezoid region are equal to each other (refer to, for example, Japanese Patent Laid-open No. 2003-242607), an almost-T-shape in which the width of the rectangular region is wider than the maximum width of the inverted-trapezoid region (refer to, for example, Japanese Patent Laid-open No. 2003-242608), and the like are known. In the case of forming the magnetic pole layer including the magnetic pole end face having the hexagonal shape or almost-T-shape, for example, a lower layer portion corresponding to the inverted-trapezoid region is formed by using a method of forming the magnetic pole layer including the magnetic pole end face having the inverted-trapezoid shape and, after that, an upper layer portion corresponding to the rectangular region is formed on the lower layer portion, thereby forming the magnetic pole layer by the process of two steps. For example, in the case of forming the magnetic pole layer by using a polishing process to planarize the trailing edge, the magnetic pole layer having the magnetic pole end face of this kind has an advantage from the viewpoint of precision of formation of the magnetic pole layer. Specifically, in the case of forming the magnetic pole layer including the magnetic pole end face of the shape obtained by combing the rectangle and trapezoid by using the polishing process, different from the case of forming the magnetic pole layer having the magnetic pole end face of the inverted trapezoid shape by using the polishing process, as long as the polishing amount of the magnetic pole layer is set to be within the range of the height of the rectangular region, the width of the trailing edge is always determined on the basis of the width of the rectangular region. Consequently, variations in the width of the trailing edge caused by variations in the polishing amount of the magnetic pole layer are suppressed.

To spread the thin film magnetic head of the perpendicular recording method, it is important to establish a manufacturing technique capable of manufacturing, for example, a thin film magnetic head of high performance with high precision. With respect to this point, the conventional method of manufacturing a th film magnetic head capable of forming a magnetic pole layer having a magnetic pole end face of the shape obtained by combining the rectangle and inverted trapezoid is useful as the manufacturing technique for manufacturing a high-performance thin film magnetic head with high precision. However, when mass productivity and manufacture easiness are considered in addition to the performance and manufacture precision as described above to spread thin film magnetic heads, since the lower layer portion corresponding to the inverted trapezoid region and the upper layer portion corresponding to the rectangular region are formed separately in manufacturing a thin film magnetic head, that is, the magnetic pole layer is formed by the process of two steps, the process of forming the magnetic pole layer is complicated and the number of processes required to form the magnetic pole layer is large. Consequently, there is still room for improvement in the conventional method of manufacturing a thin film magnetic head from the viewpoint of forming the magnetic pole layer as easily as possible.

SUMMARY OF THE INVENTION

The present invention has been achieved in consideration of such problems and its first object is to provide a method of manufacturing a thin film magnetic head, capable of forming a magnetic pole layer as easily as possible.

A second object of the invention is to provide a thin film magnetic head manufactured by using the method of manufacturing a thin film magnetic head of the invention.

A third object of the invention is to provide a magnetic recording apparatus on which the thin film magnetic head of the invention is mounted.

The invention provides a method of manufacturing a thin film magnetic head comprising: a thin film coil for generating a magnetic flux; and a magnetic pole layer extending rearward from a recording-medium-facing surface facing a recording medium traveling in a medium travel direction and having a magnetic pole portion which emits the magnetic flux generated by the thin film coil toward the recording medium, wherein a step of forming the magnetic pole portion in the magnetic pole layer includes: a first step of forming a first insulating layer on the medium travel direction and forming a second insulating layer on a direction opposite to the medium travel direction, thereby laminating the first and second insulating layers; a second step of patterning a mask having an opening corresponding to a shape in plan view of the magnetic pole portion, on the first insulating layer; a third step of forming a first magnetic pole formation space so as to have a uniform width, in the first insulating layer by selectively etching the first insulating layer by using reactive ion etching until the second insulating layer is exposed via the opening in the mask; a fourth step of forming a second magnetic pole formation space so as to have a width gradually narrowed with dance from the first magnetic pole formation space, in the second insulating layer by selectively etching the second insulating layer via the first magnetic pole formation space formed in the first insulating layer by using reactive ion etching; and a fifth step of forming the magnetic pole portion in the first and second magnetic pole formation spaces, and the magnetic pole portion is formed so as to include a first magnetic pole portion positioned on the medium travel direction and having a uniform width in the medium travel direction and a second magnetic pole portion positioned on the direction opposite to the medium travel direction, magnetically coupled to the first magnetic pole portion, and having a width gradually narrowed with distance from the first magnetic pole portion, and so as to have a configuration in which the first and second magnetic pole portions are integrated.

In the method of manufacturing a thin film magnetic head according to the invention, the first magnetic pole formation space is armed so as to have a uniform width, in the first insulating layer by selectively etching the first and second insulating layers via the opening in the mask by using reactive ion etching, and the second magnetic pole formation space is formed in the second insulating layer so as to have a width gradually narrowed with distance from the first magnetic pole formation space. After that, the magnetic pole portion is formed in the first and second magnetic pole formation spaces. Since the magnetic pole layer having the structure in which the first and second magnetic pole portions are integrated is formed in a lump in one process by using the first and second magnetic pole formation spaces formed in the first and second insulating layers, as compared with the case of forming the magnetic pole portion by two steps of separately forming the first and second magnetic pole portions, the process of forming the magnetic pole portion is simplified and the number of processes required to form the magnetic pole layer is reduced.

A thin film magnetic head according to the invention comprises: a thin film coil for generating a magnetic flux; a magnetic pole layer extending rearward from a recording-medium-facing surface facing a recording medium traveling in a medium travel direction and having a magnetic pole portion which emits the magnetic flux generated by the thin film coil toward the recording medium; and an insulating layer formed in the periphery of the magnetic pole layer. The magnetic pole portion in the magnetic pole layer includes a first magnetic pole portion positioned on the medium travel direction and having a uniform width in the medium travel direction and a second magnetic pole portion positioned on a direction opposite to the medium travel direction, magnetically coupled to the first magnetic pole portion, and having a width gradually narrowed with distance from the first magnetic pole portion, and has a configuration in which the first and second magnetic pole portions are integrated. The insulating layer has a configuration in which a first insulating layer formed in the periphery of the first magnetic pole portion in the magnetic pole portion and a second insulating layer formed in the periphery of the second magnetic pole portion are laminated.

In the thin film magnetic head according to the invention, the magnetic pole portion in the magnetic pole layer includes the first and second magnetic pole portions and has a characteristic configuration in which the first and second magnetic pole portions are integrated, and the insulating layer has a characteristic configuration in which the first and second insulating layers are laminated.

A magnetic recording apparatus according to the invention comprises: a recording medium traveling in a medium travel direction; and a thin film magnetic head for performing a magnetic process on the recording medium. The thin film magnetic head includes: a thin film coil for generating a magnetic flux; a magnetic pole layer extending rearward from a recording-medium-facing surface facing the recording medium traveling in the medium travel direction and having a magnetic pole portion which emits the magnetic flux generated by the thin film coil toward the recording medium; and an insulating layer formed in the periphery of the magnetic pole layer. The magnetic pole portion in the magnetic pole layer includes a first magnetic pole portion positioned on the medium travel direction and having a uniform width in the medium travel direction and a second magnetic pole portion positioned on a direction opposite to the medium travel direction, magnetically coupled to the first magnetic pole portion, and having a width gradually narrowed with distance from the first magnetic pole portion, and has a configuration in which the first and second magnetic pole portions are integrated. The insulating layer has a configuration in which a first insulating layer formed in the periphery of the first magnetic pole portion in the magnetic pole portion and a second insulating layer formed in the periphery of the second magnetic pole portion are laminated.

In the magnetic recording apparatus according to the invention, the th film magnetic head of the invention having the above-described characteristic configuration is mounted.

In the method of forming a thin film magnetic head according to the invention, in the first step, the first insulating layer is formed by using a material whose etching rate in reactive ion etching is relatively high, and the second insulating layer is formed by using a material whose etching rate in reactive ion etching is relatively low. Concretely, it is preferable to form the first insulating layer by using silicon (Si), silicon nitride ($Si_3N_4$) or silicon oxide ($SiO_2$) and to form the second insulating layer by using aluminum oxide ($Al_2O_3$). In this case, in the third and fourth steps, it is preferable to perform reactive ion etching by using a gas containing at least one of carbon tetrafluoride ($CF_4$) and trifluoromethane ($CHF_3$) or at least one of chlorine ($Cl_2$) and boron trichloride ($BCl_3$). Concretely, it is preferable to perform reactive ion etching by using the same gas.

The method of manufacturing a thin film magnetic head according to the invention further comprises a seventh step of forming a stopper layer by using a non-magnetic metal material in a region including a region corresponding to the shape in plan view of the magnetic pole portion. The first and second insulating layers are formed so as to cover the stopper layer in the first step, and the second insulating layer is etched until the stopper layer is exposed in the fourth step. In this case, it is preferable to form the stopper layer is farmed by using platinum (Pt), copper (Cu), gold (Au), palladium (Pd), rhodium (Rh), beryllium (Be), iridium (Ir), ruthenium (Ru), or any of alloys of those materials, and to form the magnetic pole portion by growing a plating film by using the stopper layer as a seed layer in the fifth step.

In the method of manufacturing a thin film magnetic head according to the invention, the second step may include: a step of forming a seed layer on the first insulating layer; a step of forming a photoresist pattern so as to have a shape in plan view corresponding to a shape in plan view of the magnetic pole portion, on the seed layer; a step of growing a plating film so as to cover the photoresist pattern and the seed layer around the photoresist pattern by using the seed layer; and a step of forming the mask having the opening in the position in which the photoresist pattern was disposed: by lifting off the photoresist pattern to make the plating film partially remain. In this case, it is preferable to form the photoresist pattern so that a portion corresponding to the magnetic pole portion has a first width and ash the photoresist pattern, thereby narrowing the width of the portion corresponding to the magnetic pole portion from the first width to a second width smaller than the first width, and to form the mask so that the opening has a third width by narrowing the width of the portion corresponding to the magnetic pole portion in the photoresist pattern from the second width to the third width which is smaller than the second width by using compression accompanying growth of the plating film.

According to the method of manufacturing a thin film magnetic head of the invention, since the magnetic pole layer having the structure in which the first and second magnetic pole portions are integrated is formed in a lump in one process, the process of forming the magnetic pole layer is simplified and the number of processes required to form the magnetic pole layer is reduced. Thus, the magnetic pole layer can be formed as easily as possible.

According to the thin film magnetic head of the invention, each of the magnetic pole portion in the magnetic pole layer and the insulating layer has the characteristic configuration. To manufacture the thin film magnetic head including the magnetic pole layer and the insulating layer having such characteristic configurations, the method of manufacturing a thin film magnetic head of the invention can be applied.

Further, since the thin film magnetic head of the invention is mounted on the magnetic recording apparatus of the invention, to manufacture the magnetic recording apparatus on which the thin film magnetic head is mounted, the method of manufacturing a thin film magnetic head of the invention can be applied.

Other and further objects, features and advantages of the invention will appear more fully from the following description.

BRIEF DESCRIPTION OF THE DRAWINGS

FIGS. 14A and 14B are cross sections showing a process subsequent to FIGS. 13A and 13B.

DETAILED DESCRIPTION OF THE PREFERRED EMBODIMENTS

Embodiments of the invention will now be described in detail hereinbelow with reference to the drawings.

Figures 1A, 1B:
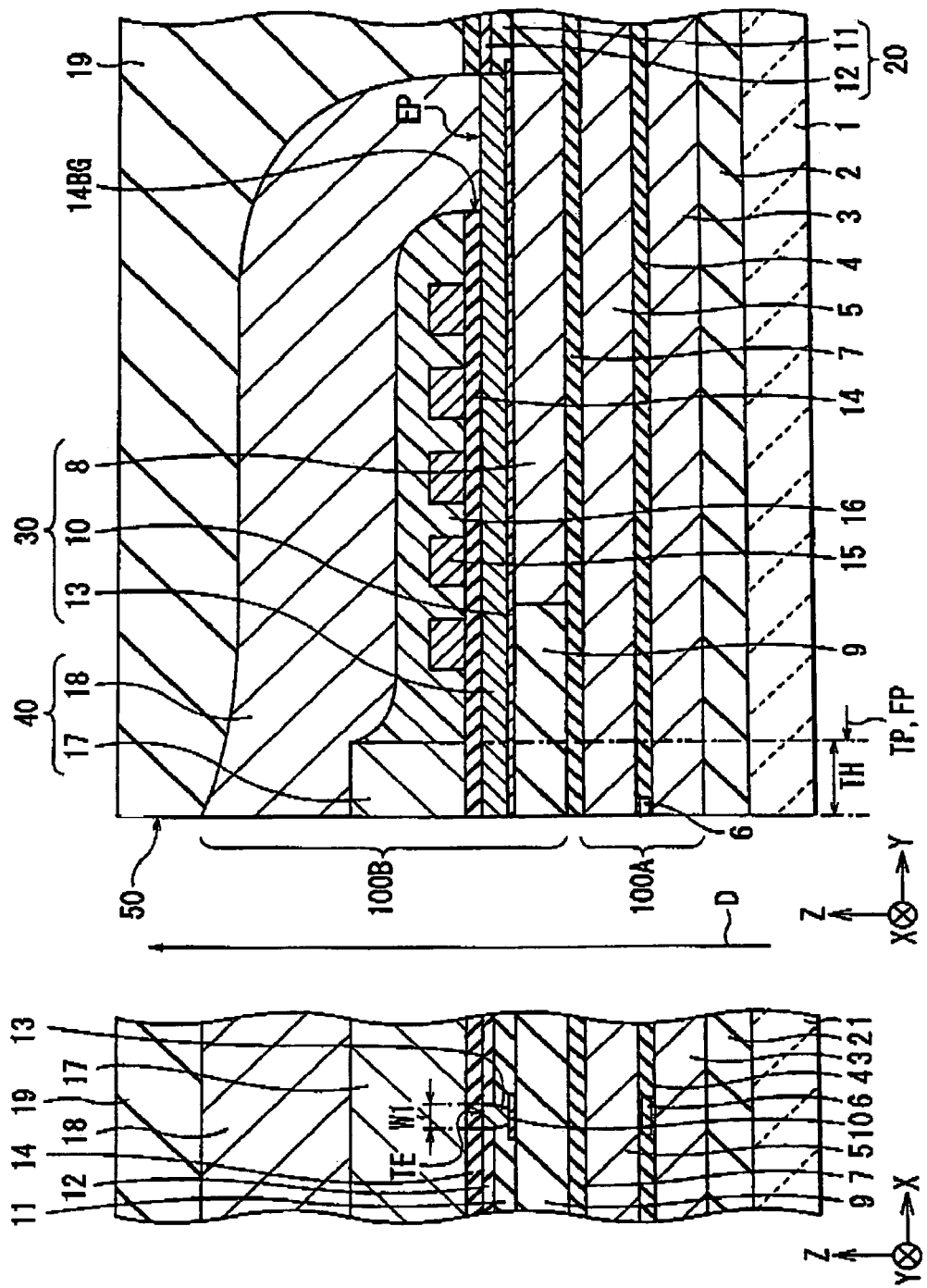
FIGS. 1A and 1B are cross sections showing a sectional configuration of a thin film magnetic head according to an embodiment of the invention.
Figure 2:
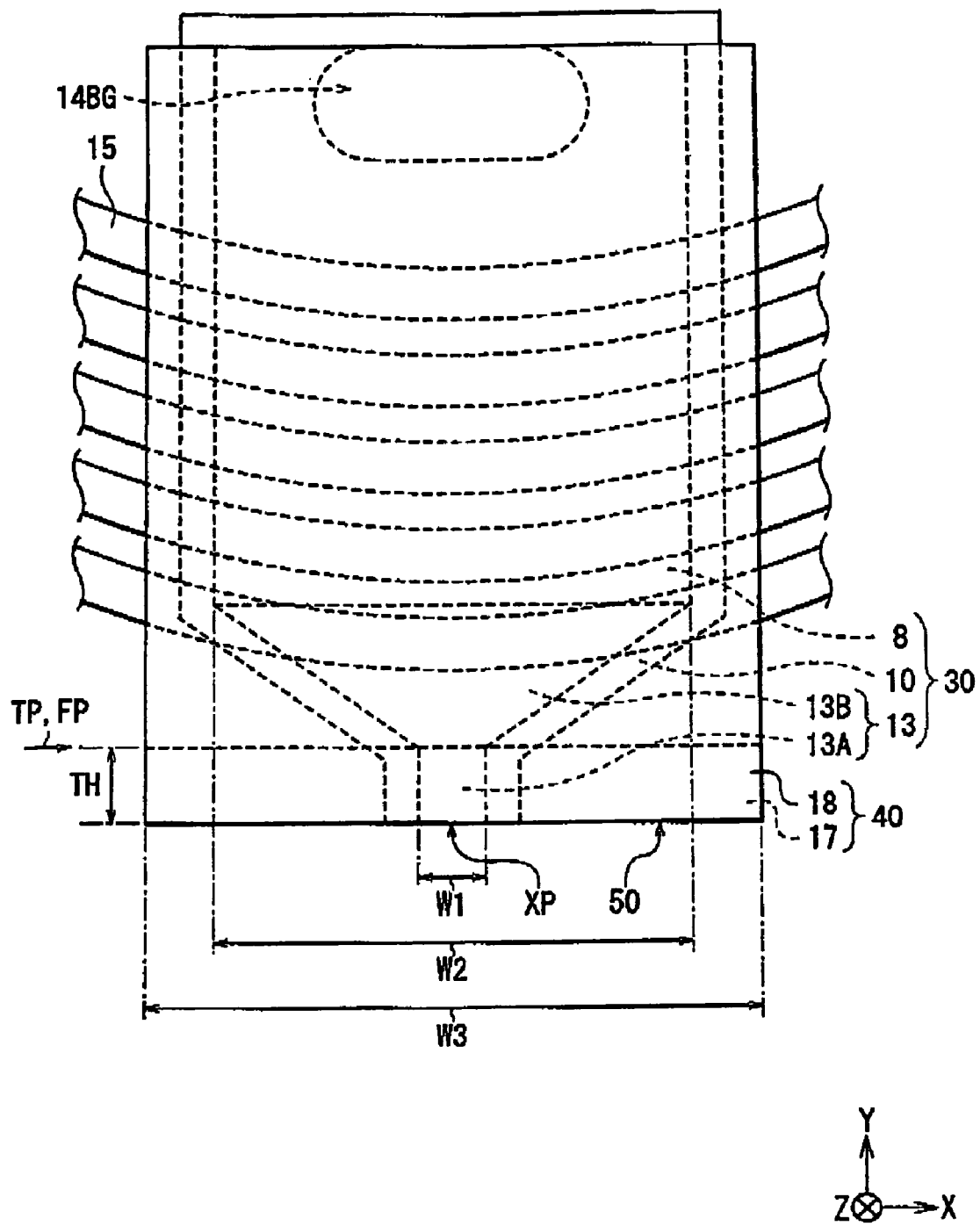
FIG. 2 is a plan view showing the configuration of a main portion of the thin film magnetic head illustrated in FIGS. 1A and 1B.
Figure 3:
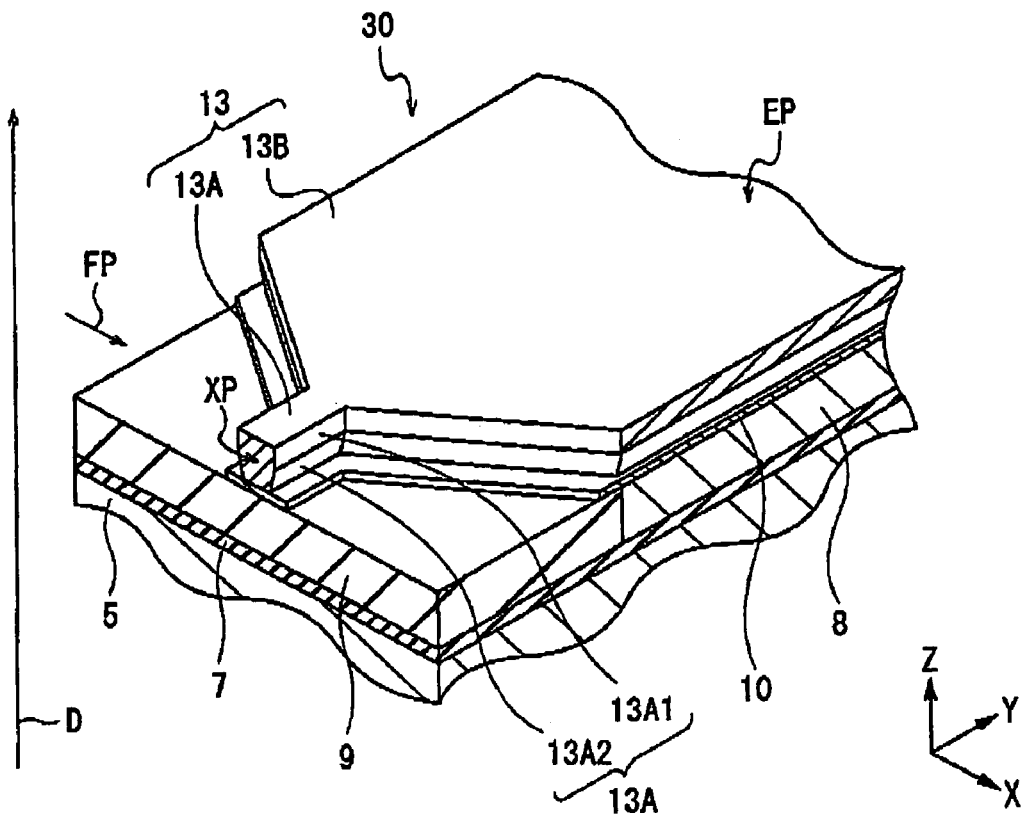
FIG. 3 is a perspective view showing the configuration of a main portion of the thin film magnetic head illustrated in FIGS. 1A and 1B.
Figure 4:
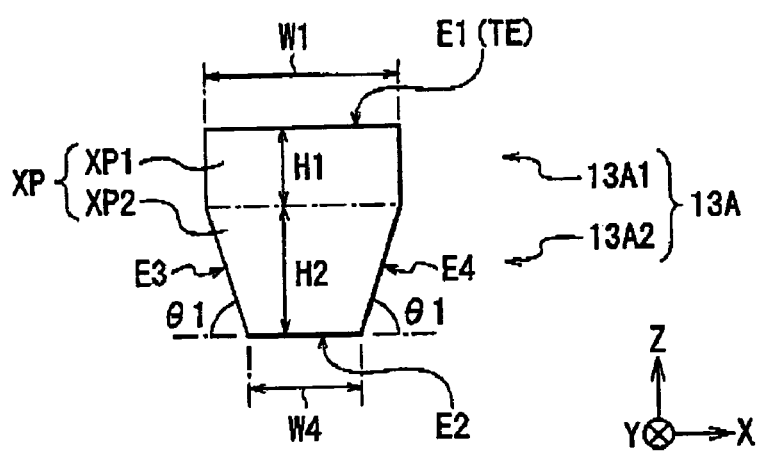
FIG. 4 is a plan view showing the configuration of a magnetic pole end face.

First, the configuration of a thin film magnetic head according to an embodiment of the invention will be described with reference to FIGS. 1A and 1B to FIG. 4. FIGS. 1A and 1B to FIG. 4 show the configuration of the thin film magnetic head. FIGS. 1A and 1B show a sectional configuration of a thin film magnetic head, FIG. 2 is a plan view of a main portion, FIG. 3 is a perspective view of the main portion, and FIG. 4 is a plan view of a magnetic pole end face. FIG. 1A shows a section parallel to an air bearing surface (section along the XZ plane) and FIG. 1B shows a section perpendicular to the air bearing surface (section along the YZ plane). An upward arrow D shown in FIGS. 1A and 1B and FIG. 3 indicates the travel direction of a magnetic recording medium (not shown) relative to the thin film magnetic head (median travel direction).

In the following description, the dimension in the X-axis direction shown in FIGS. 1A and 1B to FIG. 4 will be described as "width", the dimension in the Y-axis direction will be described as "length", and the dimension in the Z-axis direction will be described as "thickness or height". The side closer to the air bearing surface in the Y-axis direction will be des ed as "front side or forward" and the side opposite to the front side will be described as "rear side or rearward". The words will be similarly used in FIGS. 5A and 5B and subsequent drawings.

The thin film magnetic head is, for example, mounted on a magnetic recording apparatus such as a hard disk drive to perform a magnetic process on a magnetic recording medium (hereinbelow, simply called a "recording medium") such as a hard disk moving in a medium travel direction D. Concretely, the thin film magnetic head is a composite head capable of executing both of recording and reproducing processes as magnetic processes. As shown in FIGS. 1A and 1B, the thin film magnetic head has a configuration obtained by sequentially laminating, on a substrate 1 made of a ceramic material such as AlTiC ($Al_2O_3$.TiC), an insulating layer 2 made of a non-magnetic insulating material such as aluminum oxide ($Al_2O_3$, hereinbelow, simply called "alumina"), a reproduction head portion 100A for executing a reproducing process by using a magneto-resistive (MR) effect, an isolation layer 7 made of a non-magnetic insulating material such as alumina, a recording head portion 100B of a shield type for executing a recording process of a perpendicular recording method, and an overcoat layer 19 made of a non-magnetic insulating material such as alumina.

The reproduction head portion 100A has, for example, a configuration in which a lower read shield layer 3, a shield gap film 4, and an upper read shield layer 5 are laminated in this order. In the shield gap film 4, an MR device 6 as a reproduction device is buried so that one end face is exposed to a recording-medium-facing surface (air bearing surface) 50 which faces a recording medium.

The lower and upper read shield layers 3 and 5 are used to magnetically isolate the MR device 6 from the periphery and extend rearward from the air bearing surface 50. The lower and upper read shield layers 3 and 5 are made of, for example, a magnetic material such as a nickel iron alloy (NiFe (for example, Ni: 80% by weight and Fe: 20% by weight) which will be simply called "permalloy (trademark)" hereinbelow). Each of the layers 3 and 5 has a thickness of about 1.0 to 2.0 µm.

The shield gap film 4 is used to electrically isolate the MR device 6 from the periphery and is made of, for example, a nonmagnetic insulating material such as alumina.

The MR device 6 is provided to execute a magnetic process (reproducing process) by using the GMR (Giant Magneto-Resistive) effect, TMR (Tunneling Magneto-Resistive) effect, or the like.

The recording head portion 100B has a configuration, for example, in which a magnetic pole layer 30 whose periphery is formed by insulating layers 9 and 20, a gap layer 14 having an opening for magnetic coupling (back gap 14BG), a thin film coil 15 buried by an insulating layer 16, and a write shield layer 40 are laminated in this order.

The magnetic pole layer 30 is provided to contain a magnetic flux generated by the thin film coil 15 and to emit the magnetic flux toward a recording medium, thereby executing the magnetic process (recording process). The magnetic pole layer 30 extends rearward from the air bearing surface 50. Concretely, the magnetic pole layer 30 extends to a position corresponding to the back gap 14BG provided in the gap layer 14.

The magnetic pole layer 30 has a structure in which, for example, as shown in FIGS. 1A and 1B to FIG. 3, an auxiliary magnetic pole layer 8 surrounded by the insulating layer 9, a stopper layer 10, and a main magnetic pole layer 13 surrounded by the insulating layer 20 are laminated in this order. In other words, the magnetic pole layer 30 has a three-layer structure in which the auxiliary magnetic pole layer 8 is disposed on the leading side and the main magnetic pole layer 13 is disposed on the trailing side while sandwiching the stopper layer 10. The "leading side" denotes an inflow side (the side opposite to the D side in the medium travel direction) when a traveling state of the recording medium traveling to the (D side in the medium travel direction shown in FIGS. 1A and 1B and FIG. 8 is regarded as a flow. In this case, the leading side is the down side in the thickness direction (Z-axis direction). In contrast, the outflow side (D side in the medium travel direction) is called a "trailing side" which is an upper side in the thickness direction. FIGS. 2 and 3 show the configuration of the main magnetic pole layer 13 and its peripheral portion in the tin film magnetic head.

The main magnetic pole layer 13 functions as a main magnetic flux emitting portion and is made of a magnetic material such as permalloy or iron-cobalt-based alloy. The iron-cobalt-based alloy is, for example, an iron cobalt alloy (FeCo) or an iron cobalt nickel alloy (FeCoNi). The main magnetic pole layer 13 extends from the air bearing surface 50 to a position corresponding to the back gap 14BG, and its end face EP on the trailing side is planarized.

The main magnetic pole layer 13 includes, for example, as shown in FIGS. 2 and 3, a front end portion 13A (magnetic pole portion) extending rearward from the air bearing surface 50 and having a uniform width W1 (W1=about 0.13 µm to 0.17 µm) specifying the recording track width of a recording medium, and a rear end portion 13B magnetically coupled to the rear side of the front end portion 13A, extending to the position corresponding to the back gap 14BG, and having a width W2 larger than the width W1 of the front end portion 13A (W2>W1). The width of the rear end portion 13B is, for example, the uniform width W2 in a rear portion and, in a front portion, is gradually narrowed toward the front end portion 13A from the width W2 to the width W1. The position at which the width of the main magnetic pole layer 13 expands from the front end portion 13A (width W1) to the rear end portion 13B (width W2) is a flare point FP as one of important factors determining the recording performance of the thin film magnetic head.

The front end portion 13A is a portion substantially emitting a magnetic flux generated by the thin film coil 15 toward a recording medium, and has an exposed face (magnetic pole end face) XP exposed to the air bearing surface 50. The magnetic pole end face XP has a shape obtained by combining an upper region XP1 positioned on the trailing side and having a rectangular shape (width W1 and height H1) and a lower region XP2 positioned on the leading side and having an inverted trapezoid shape (height H2). That is, the magnetic pole end face XP has a hexagon shape whose an upper edge E1 has a width W1 and whose lower edge E2 bas a width W4 smaller than the width W1 (W4<W1). The width of the upper region XP1 is constant (width W1) in the height direction (Z axis direction), and the width of the lower region XP2 is gradually narrowed from the width W1 to the width W4 with distance from the upper region XP1. The angle (taper angle) θ1 of each of sides E3 and E4 of the lower region XP2 from the horizontal line (x axis) can be freely set as long as the lower region XP2 has an inverted trapezoid shape and is concretely about 77 to 89°. The upper edge E1 is a trailing edge TE as a substantial recording part of the main magnetic pole layer 13.

Particularly, the front end portion 13A has a sectional shape similar to that of the magnetic pole end face XP irrespective of a position in the longitudinal direction (Y-axis direction) and includes: an upper front end portion 13A1 (first magnetic pole portion) positioned on the trailing side and having a uniform width W1 in the thickness direction; and a lower front end portion 13A2 (second magnetic pole portion) positioned on the leading side, magnetically coupled to the upper front end portion 13A1, and gradually narrowed with distance from the upper front end portion 13A1 from the width W1 to the width W4. The upper front end portion 13A1 and the lower front end portion 13A2 are integrated. "Integration" in this case means that the upper and lower front end portions 13A1 and 13A2 are constructed so as to be continuous without any joint line between them, that is, the upper and lower front end portions 13A1 and 13A2 are not formed separately from each other but are formed integrally.

The auxiliary magnetic pole layer 8 functions as an auxiliary part for containing the magnetic flux for the main magnetic pole layer 13 and extends from a position backward of the air bearing surface 50 to a position corresponding to the back gap 14BG. The auxiliary magnetic pole layer 8 has, for example, as shown in FIG. 2, a rectangular shape in plan view, having the width W2.

The stopper layer 10 is used for controlling progress of an etching process at the time of forming the main magnetic pole layer 13 by using the etching technique. The stopper layer 10 is made of, for example, a non-magnetic metal material such as platinum (Pt), copper (Cu), gold (Au), palladium (Pd), rhodium (Rh), beryllium (Be), iridium (Ir), ruthenium (Ru), or any of alloys of those materials. The thickness of the stopper layer 10 is about 0.015 μm to 0.3 μm. An example of the "alloys" is a gold copper (AuCu) alloy. A concrete etching process progress controlling action by the stopper layer 10 will be described later.

The insulating film 9 is used for electrically isolating the auxiliary magnetic pole layer 8 from the periphery and is made of, for example, a non-magnetic insulating material such as alumina.

The insulating layer 20 is used for electrically isolating the main magnetic pole layer 13 from the periphery. The insulating layer 20 has a configuration in which a lower insulating layer 11 (second insulating layer) surrounding the lower front end portion 13A2 and a portion corresponding to the lower front end portion 13A2 (lower portion in the rear end portion 13B) and an upper insulating layer 12 (first insulating layer) surrounding the upper front end portion 13A1 and a portion corresponding to the upper front end portion 13A1 (upper portion in the rear end portion 13B) are laminated. Each of the lower and upper insulating layers 11 and 12 is made of a non-magnetic insulating material. Concretely, for example, the lower insulating layer 11 is made of alumina, and the upper insulating layer 12 is made of silicon (Si), silicon nitride ($Si_3N_3$), or silicon oxide ($SiO_2$).

The gap layer 14 is to construct a gap for magnetic isolation between the magnetic pole layer 30 and the write shield layer 40. The gap layer 14 is made of, for example, a non-magnetic insulating material such as alumina and has a thickness of about 0.2 μm or less.

The thin film coil 15 generates a magnetic flux for recording and is made of, for example, a conductive material such as copper (Cu). The thin film coil 15 has, for example as shown in FIG. 2, a winding structure of turns around the back gap 14BG as a center. In FIGS. 1A and 1B and FIG. 2, only part of a plurality of turns constructing the thin film coil 15 is shown.

The insulating layer 16 covers the thin film coil 15 to electrically isolate it from the periphery and is disposed on the gap layer 14 so as not to cover the back gap 14BG. The insulating layer 16 is made of a photoresist (photosensitive resin), spin on glass (SOG), or the like which displays fluidity when heated. A peripheral portion of the insulating film 16 has a rounded and inclined surface. The position of the front end of the insulating layer 16 is a "throat height zero position TP" as one of important factors determining the recording performance of the thin film magnetic head. The distance between the throat height zero position TP and the air bearing surface 50 is "throat height TH". The throat height TH is about 0.3 μm or less. FIGS. 1A and 1B and FIG. 2 show, as an example, the case where the throat height zero position TP coincides with the flare point FP.

The write shield layer 40 is provided to receive a spread component of a magnetic flux emitted from the magnetic pole layer 30 and to prevent spread of the magnetic flux. The write shield layer 40 extends read from the air bearing spice 50. More concretely, the write shield layer 40 is isolated from the magnetic pole layer 30 by the gap layer 14 on the side near to the air bearing surface 50 and is adjacent to and magnetically coupled to the magnetic pole layer 30 via the back gap 14BG on the side far from the air bearing surface 50. Particularly, the write shield layer 40 includes, for example, two separate components; a TH specifying layer 17 functioning as a main magnetic flux receiving port, and a yoke layer 18 functioning as a passage of the magnetic flux received by the TH specifying layer 17.

The TH specifying layer 17 is adjacent to the gap layer 14 and extends from the air bearing surface 50 to a position between the air bearing surface 50 and the back gap 14BG, concretely, a position between the air bearing surface 50 and the thin film coil 15. The TH specifying layer 17 is made of, for example, a magnetic material such as permalloy or iron-cobalt-based alloy and has a rectangular shape in plan view having width W3 larger than the width W2 of the magnetic pole layer 30 (W3>W2) as shown in FIG. 2. The insulating layer 16 in which the thin film coil 15 is buried is adjacent to the TH specifying layer 17. That is, the TH specifying layer 17 has a role of specifying the front end position (throat height zero position TP) of the insulting layer 16, more concretely, specifying the throat height TH.

The yoke layer 18 extends from the air bearing surface 50 to a position corresponding to the back gap 14BG so as to cover the insulating layer 16. A front portion of the yoke layer 18 is formed on and is magnetically coupled to the TH specifying layer 17 and a rear portion of the yoke layer 18 is adjacent to and magnetically coupled to the magnetic pole layer 30 via the back gap 14BG. The yoke layer 18 is made of for example, a magnetic material similar to that of the TH specifying layer 17 and has a rectangular shape in plan view having the width W3 like the TH specifying layer 17 as shown in FIG. 2.

The operation of the thin film magnetic head will now be described with reference to FIGS. 1 and 1B to FIG. 4.

In the thin film magnetic head, at the time of recording information, when a current flows into the thin film coil 15 of the recording head portion 100B from a not-shown external circuit, a magnetic flux is generated in the thin film coil 15. The magnetic flux generated at this time is contained by the magnetic pole layer 30 and flows mainly in the main magnetic pole layer 13 from the rear end portion 13B to the front end portion 13A. Since the magnetic flux flowing in the magnetic pole layer 13 is converged at the flare point FP as the width of the main magnetic pole layer 13 decreases, the magnetic flux is concentrated in a portion around the trailing edge TE in the magnetic pole end face XP of the front end portion 13A. When the magnetic flux concentrated in the portion around the trailing edge TE is emitted from the magnetic pole end face XP of the front end portion 13A to the outside, a recording magnetic field is generated in the direction orthogonal to the surface of a recording medium and the recording medium is magnetized in the perpendicular direction by the recording magnetic field, thereby magnetically recording information onto the recording medium. At the time of recording information, a spread component of the magnetic flux emitted from the magnetic pole end face XP of the front end portion 13A is received by the write shield layer 40, so that spread of the magnetic flux is prevented. The magnetic flux received by the write shield layer 40 is returned to the magnetic layer 30 via the back gap 14BG.

On the other hand, at the time of reproducing information, when a sense current flows into the MR device 6 in the reproduction head portion 100A, the resistance value of the MR device 6 changes according to a signal magnetic field for reproduction from the recording medium. Since the resistance change is detected as a change in the sense current, the information recorded on the recording medium is magnetically read.

A method of manufacturing the thin film magnetic head shown in FIGS. 1A and 1B to FIG. 4 will now be described with reference to FIGS. 1A and 1B to FIGS. 15A and 15B. FIGS. 5A and 5B to FIGS. 15A and 15B are diagrams for explaining processes of manufacturing the thin film magnetic head and show sectional configurations corresponding to FIGS. 1A and 1B.

In the following, first, an outline of processes of manufacturing a whole thin film magnetic head will be described with reference to FIGS. 1A and 1B. After that, processes of forming a main portion (the magnetic pole layer 30) of the thin film magnetic head will be described in detail with reference to FIGS. 1A and 1B to FIGS. 15A and 15B. Description of the materials, dimensions, structural features, and the like of the series of the components of the thin film magnetic head, which have been already described in detail, will not be repeated.

The thin film magnetic head is manufactured by sequentially forming and laminating the components by mainly using an existing thin film process including a film forming technique such as plating and sputtering, a patterning technique such as photolithography technique, and an etching technique such as dry etching or wet etching. Specifically, first, as shown in FIGS. 1A and 1B, the insulating layer 2 is formed on the substrate 1 and, after that, the lower read shield layer 3, the shield gap film 4 in which the MR device 6 is buried, and the upper read shield layer 5 are laminated on the insulating layer 2 in this order, thereby forming the reproduction head portion 100A. Subsequently, the isolation layer 7 is formed on the reproduction head portion 100A. On the isolation layer 7, by sequentially laminating the magnetic pole layer 30 (the auxiliary magnetic pole layer 8, stopper layer 10, and main magnetic pole layer 13), the gap layer 14 in which the back gap 14BG is provided, the insulating layer 16 in which the thin film coil 15 is buried, and the write shield layer 40 (the TH specifying layer 17 and the yoke layer 18), the recording head portion 100B is formed. Finally, the overcoat layer 19 is formed on the recording head portion 100B and, after that, the air bearing surface 50 is formed by using mechanism processing and polishing process, thereby completing the thin film magnetic head.

Figure 5B:
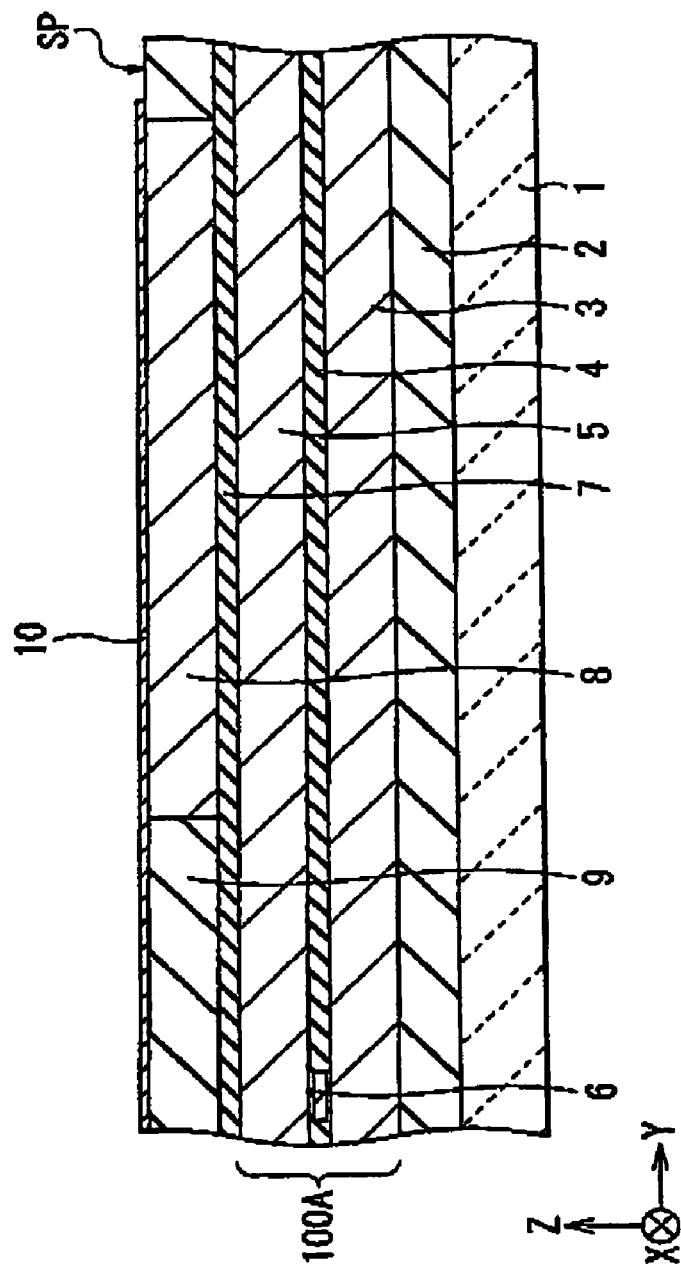
FIGS. 5A and 5B are cross sections illustrating one of processes of manufacturing the thin film magnetic head according to the embodiment of the invention.
Figure 5A:
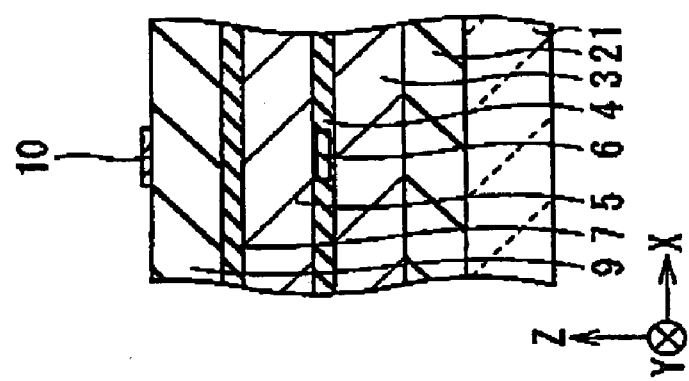

At the time of forming the main portion of the thin mm magnetic head, first, as shown in FIGS. 5A and 5B, the insulating layer 9 is armed so as to surround the auxiliary magnetic pole layer 8, and a fiat surface SP is constructed by the insulating layer 9 and auxiliary magnetic pole layer 8. On the flat surface SP, in a region including a region corresponding to the shape in plan view of the main magnetic pole layer 13 to be formed in a post process, the stopper layer 10 is formed in a pattern by using a non-magnetic metal material. The stopper layer 10 is used to control progress in the etching process at the time of forming the main magnetic pole layer 13 by using the etching technique. For example, in the case of forming the main magnetic pole layer 13 by growing a plating film, the stopper layer 10 also has the function of a seed layer for growing the plating film. Examples of the non-magnetic metal materials are platinum (Pt), copper (Cu), gold (Au), palladium (Pd), rhodium (Rh), beryllium (Be), iridium (Ir), ruthenium (Ru), and alloys of those materials (such as gold copper alloy (AuCu)). Concretely, ruthenium is used. The stopper layer 10 is formed in such a manner that, for example, as shown in FIG. 2, the stopper layer 10 has a shape in plan view corresponding to that of the main magnetic pole layer 13, and the outline of the stopper layer 10 is larger than that of the main magnetic pole layer 13. A concrete procedure of forming the stopper layer 10 is that, for example, the stopper layer 10 is formed so as to cover the flat surface SP by using sputtering and, then, is patterned by being selectively etched by using the etching technique such as ion milling.

Figure 6B:
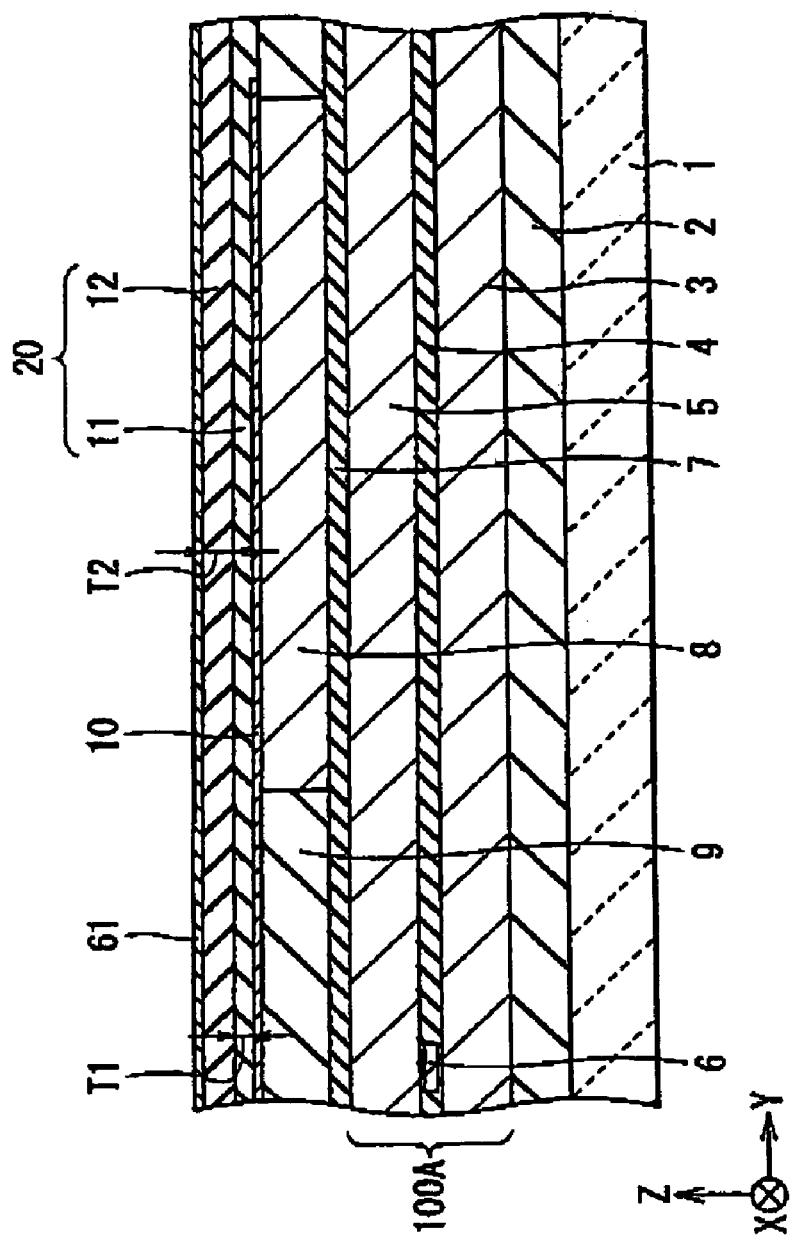
FIGS. 6A and 6B are cross sections showing a process subsequent to FIGS. 5A and 5B.
Figure 6A:
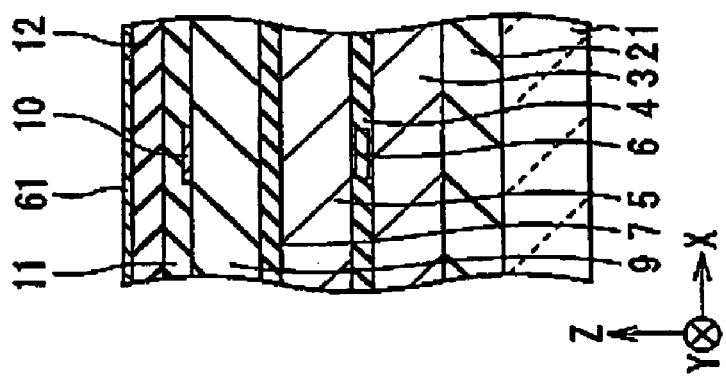

Subsequently, as shown in FIGS. 6A and 6B, the lower insulating layer 11 is formed so as to cover the stopper layer 10 and the periphery of the stopper layer 10 by using, for example, sputtering and, after that, the upper insulating layer 12 is formed on the lower insulating layer 11, thereby forming the insulating layer 20 in which the lower and upper insulating layers 11 and 12 are laminated. At the time of forming the lower and upper insulating layers 11 and 12, the lower insulating layer 11 is formed by using a material whose etching rate by reactive ion etching (hereinbelow, abbreviated as "RIE") is relatively low, and the upper insulating layer 12 is formed by using a material whose etching rate by RIE is relatively high. For example, alumina is used as the material for forming the lower insulating layer 11 and silicon (Si), silicon nitride ($Si_3N_4$), or silicon oxide ($SiO_2$) is used as the material of forming the upper insulating layer 12. Concretely, silicon oxide is used. The "relatively low etching rate" denotes that the etching rate in the case of etching the lower insulating layer 11 by using RIE is lower than that in the case of etching the upper insulating layer 12 bay using RIE. On the other hand, the "relatively high etching rate" denotes that the etching rate in the case of etching the upper insulating layer 12 by using the RIE is higher than that in the case of similarly etching the lower insulating layer 11 by using the RIE. In particular, at the time of forming the lower and upper insulating layers 11 and 12, for example, the thickness T1 and T2 of the lower and upper insulating layers 11 and 12 is set so as to correspond to the dimension (height H1 and H2) of the magnetic pole end face XP shown in FIG. 4. Concretely, the thickness T1 of the lower insulating layer 11 is equal to the height 112 of the lower region XP2 (T1=H2), and the thickness T2 of the upper insulating layer 12 is larger than the height H1 of the upper region XP1 (T2>H1).

Subsequently, as shown in FIGS. 6A and 6B, a seed layer 61 is formed on the upper insulating layer 12 by using, for example, sputtering. At the time of forming the seed layer 61, for example, a material similar to that of a mask 84 (a plating film 63) to be formed in a post process is used.

Figure 7B:
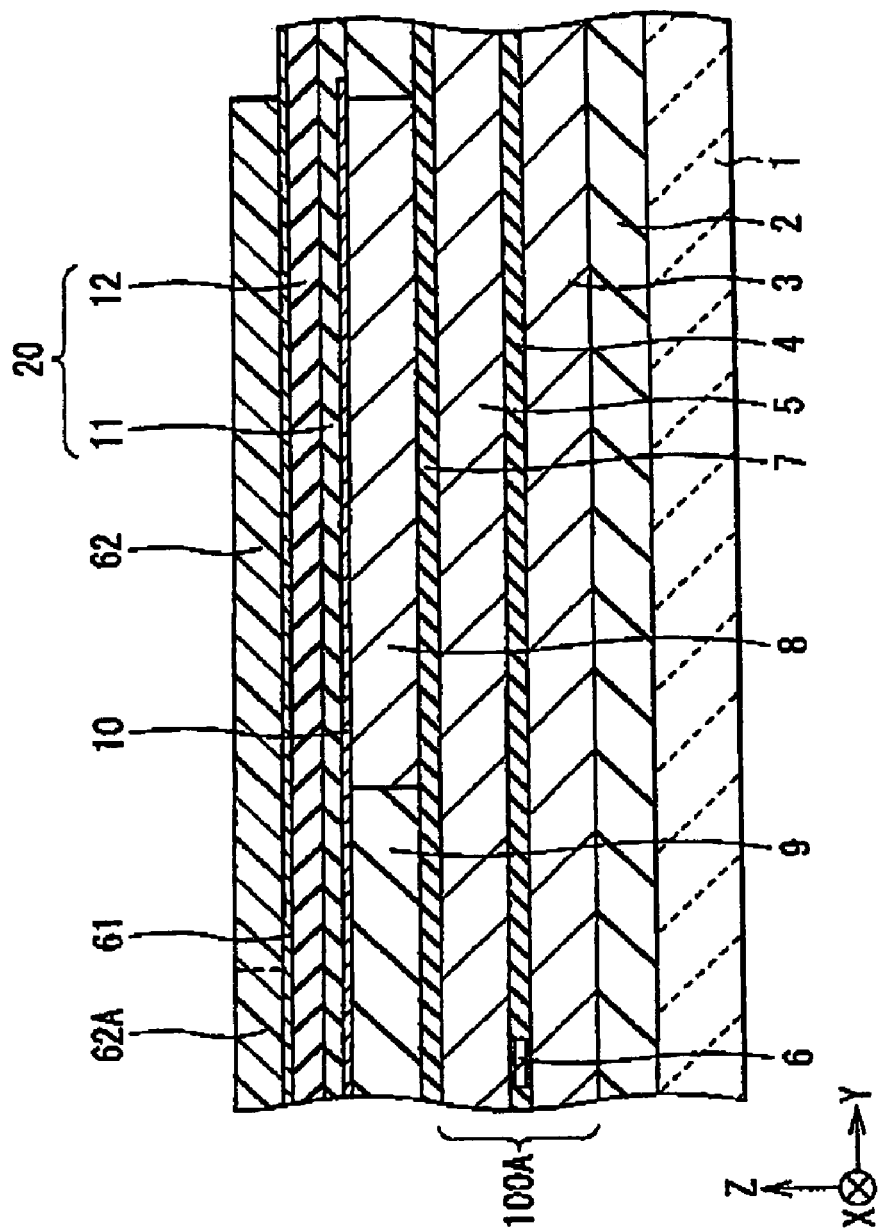
FIGS. 7A and 7B are cross sections showing a process subsequent to FIGS. 6A and 6B.
Figure 7A:
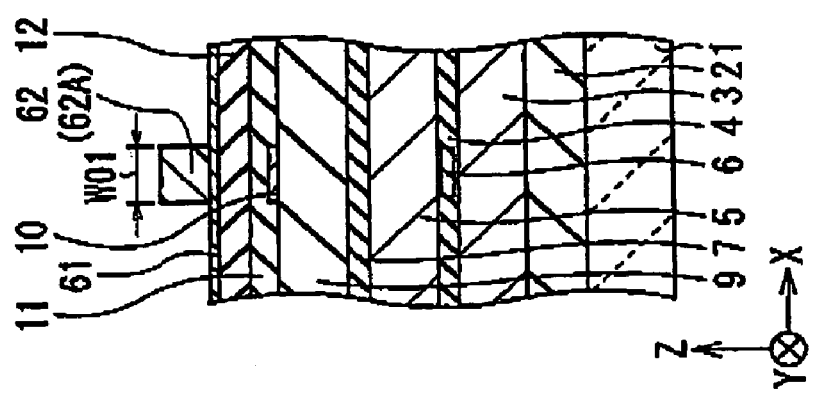

A photoresist is applied on the seed layer 61 to form a photoresist film. By patterning the photoresist film by using photolithography process, as shown in FIGS. 7A and 7B, a photoresist pattern 62 is formed. The photoresist pattern 62 is formed in a shape in plan view corresponding to that of the main magnetic pole layer 13 to be formed in a post process. Particularly, a portion (corresponding portion) 62A corresponding to the front end portion 13A in the main magnetic pole layer 13 has a width W01 larger than the width W1 of the front end portion 13A (W01>W1; first width).

Figure 8B:
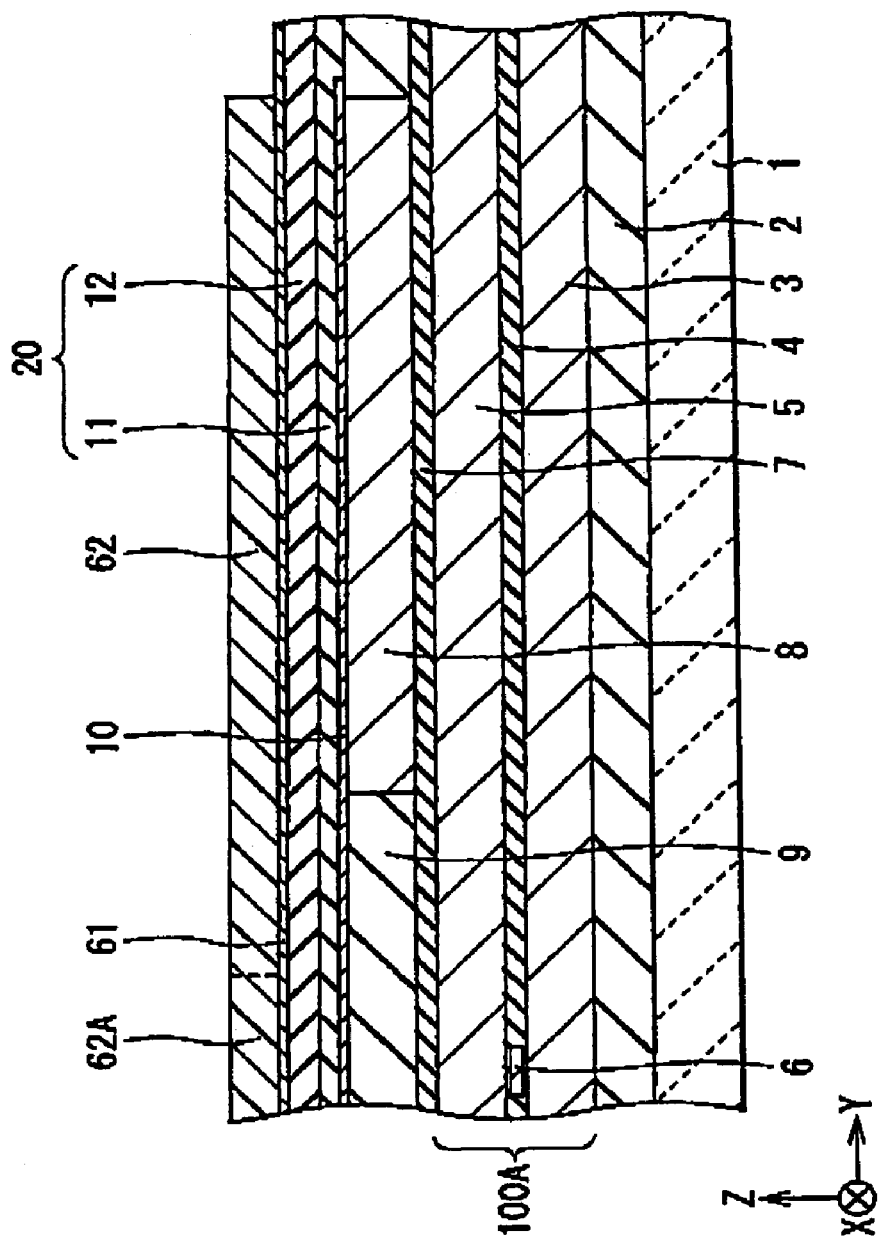
FIGS. 8A and 8B are cross sections showing a process subsequent to FIGS. 7A and 7B.
Figure 8A:
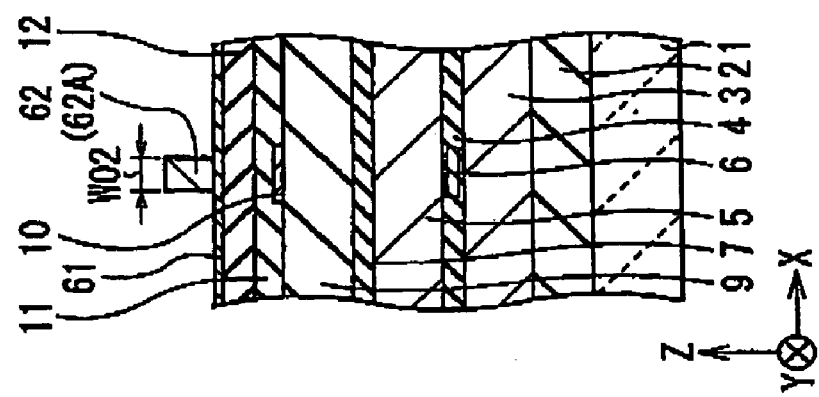

By ashing the photoresist pattern 62, as shown in FIGS. 8A and 8B, the width of the corresponding portion 62A is narrowed from the width W01 to W02 which is smaller than the width W01 (W02<W1; second width).

Figure 9B:
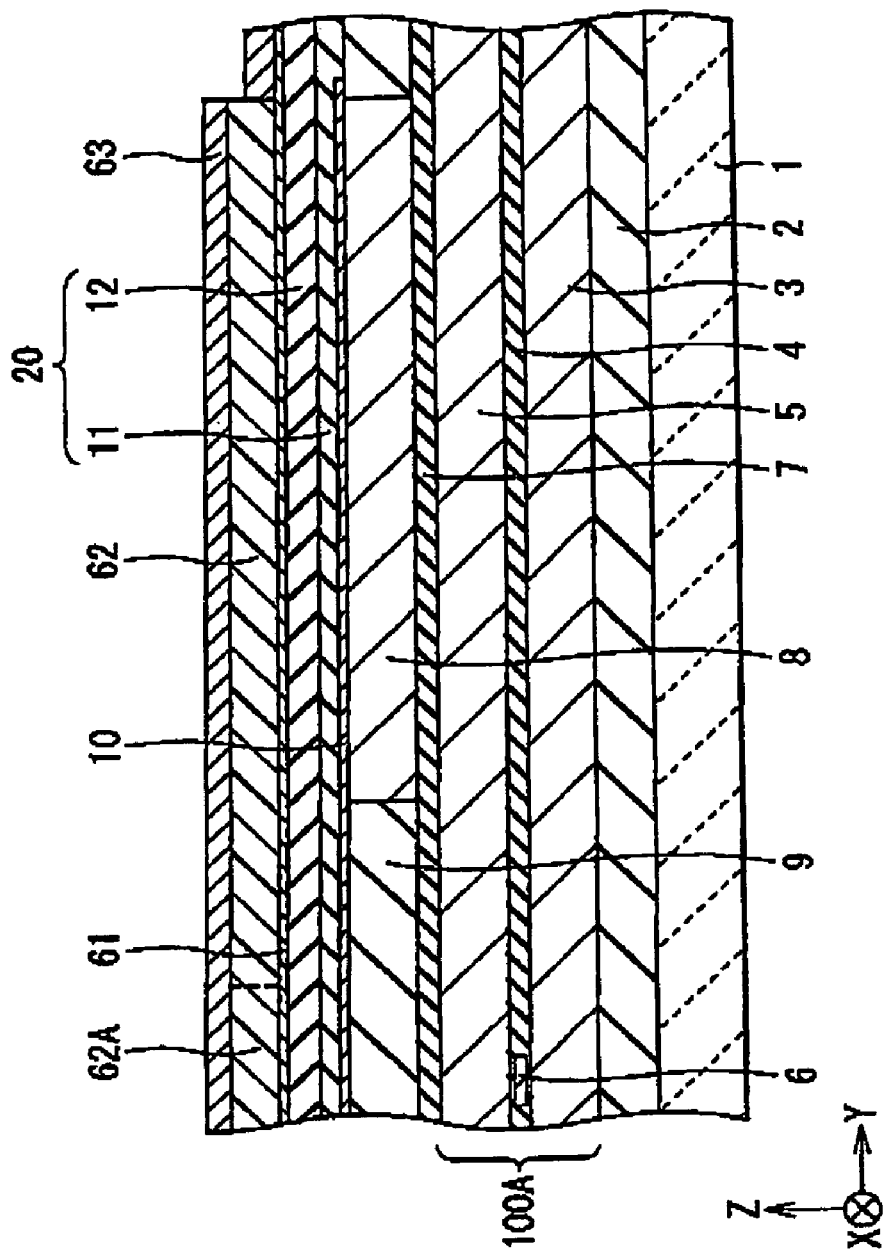
FIGS. 9A and 9B are cross sections showing a process subsequent to FIGS. 8A and 8B.
Figure 9A:
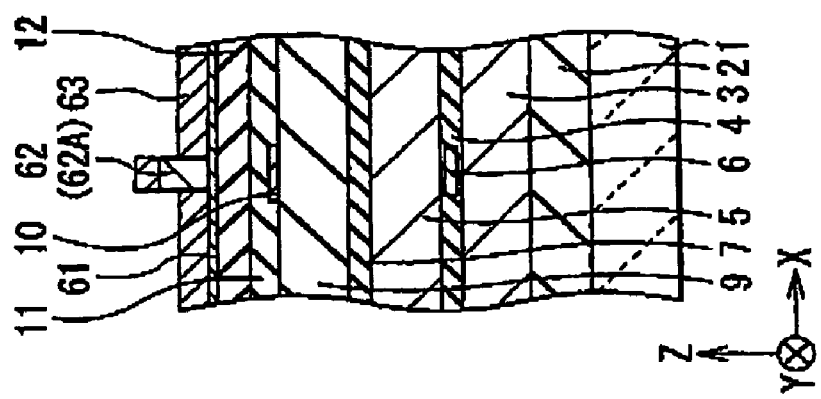
Figure 10B:
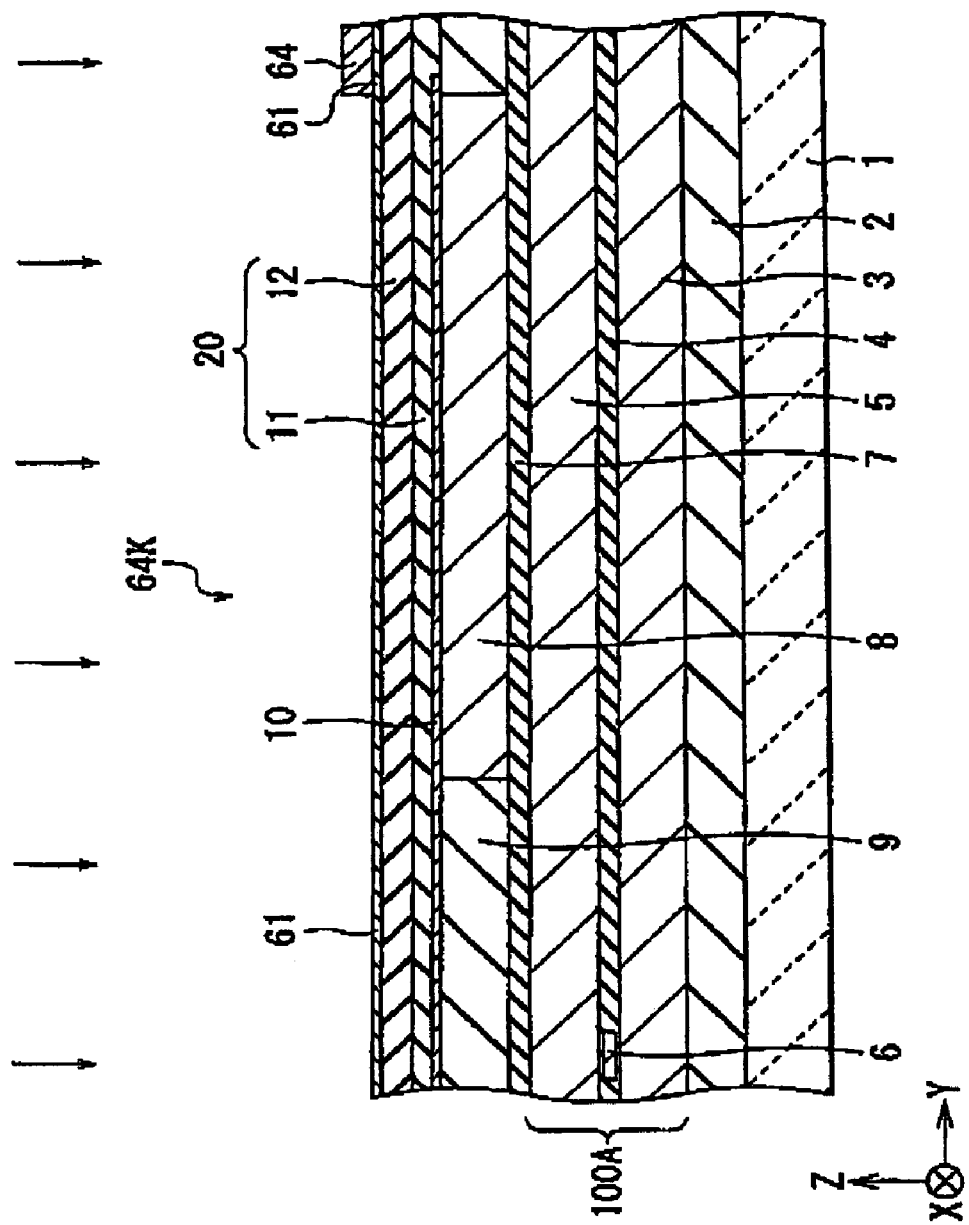
FIGS. 10A and 10B are cross sections showing a process subsequent to FIGS. 9A and 9B.
Figure 10A:
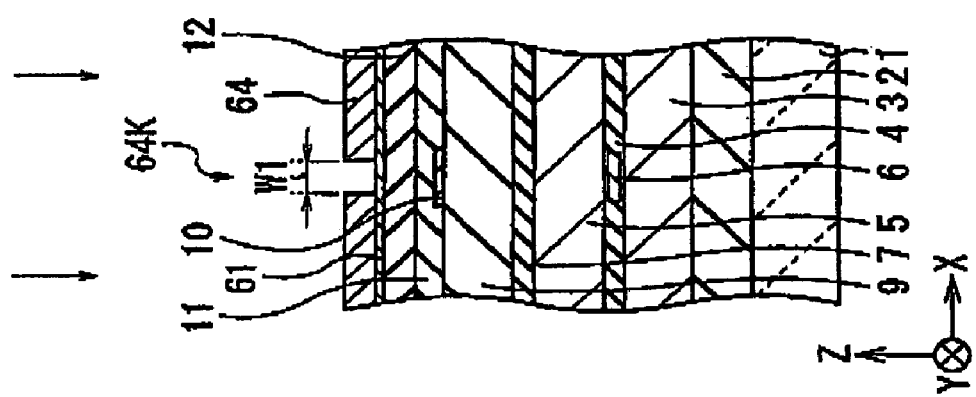

Subsequently, as shown in FIGS. 9A and 9B, the plating film 63 is grown so as to cover the photoresist pattern 62 and the seed layer 61 in the periphery of the photoresist pattern 62 and, after that, the photoresist pattern 62 is lifted off together with part of the plating film 63 (the part formed on the photoresist pattern 62 in the plating film 63), thereby patterning the mask 64 for etching having an opening 64K in a position where the photoresist pattern 62 was provided as the remaining part of the plating film 63 as shown in FIGS. 10A and 10B. As the material of the mask 64 (that is, the material of the plating film 63), a material which can be grown as a plating film such as permalloy is used. At the time of formation of the mask 64, as shown in FIGS. 8A and 8B and FIGS. 9A and 9B, when the plating film 63 is grown so as to cover the photoresist pattern 62, the photoresist pattern 62 is pressed from both sides due to pressure (swelling pressure) accompanying growth of the plating film 63. In other words, the width of the corresponding portion 62A is narrowed from the width W02 to the width W1 which is smaller than the width W02 (W1<W02; third width) by using the swelling pressure of the plating film 63. Conse-quently, as shown in FIGS. 10A and 10B, the width of the portion corresponding to the corresponding portion 62A in the opening 64K becomes the width W1 in correspondence with the width of the corresponding portion 62A. When the mask 64 is formed according to the principle as described above, the corresponding portion 62A is narrowed almost uniformly in the thickness direction (Z-axis direction) on the basis of the isotropic growing phenomenon of the plating film 63, so that the width W1 of the portion corresponding to the corresponding portion 62A in the opening 64K becomes almost uniform in the thickness direction. An example of the relation between the width W02 of the corresponding portion 62A and the width W1 of the portion corresponding to the corresponding portion 62A in the opening 64K is as follows. In the case where the thickness of the mask 64 (plating film 63) is about 0.5 μm, when W02=about 0.2 μm, W1=about 0.17 μm. When W02=about 0.16 μm, W1=about 0.13 μm.

Figure 11B:
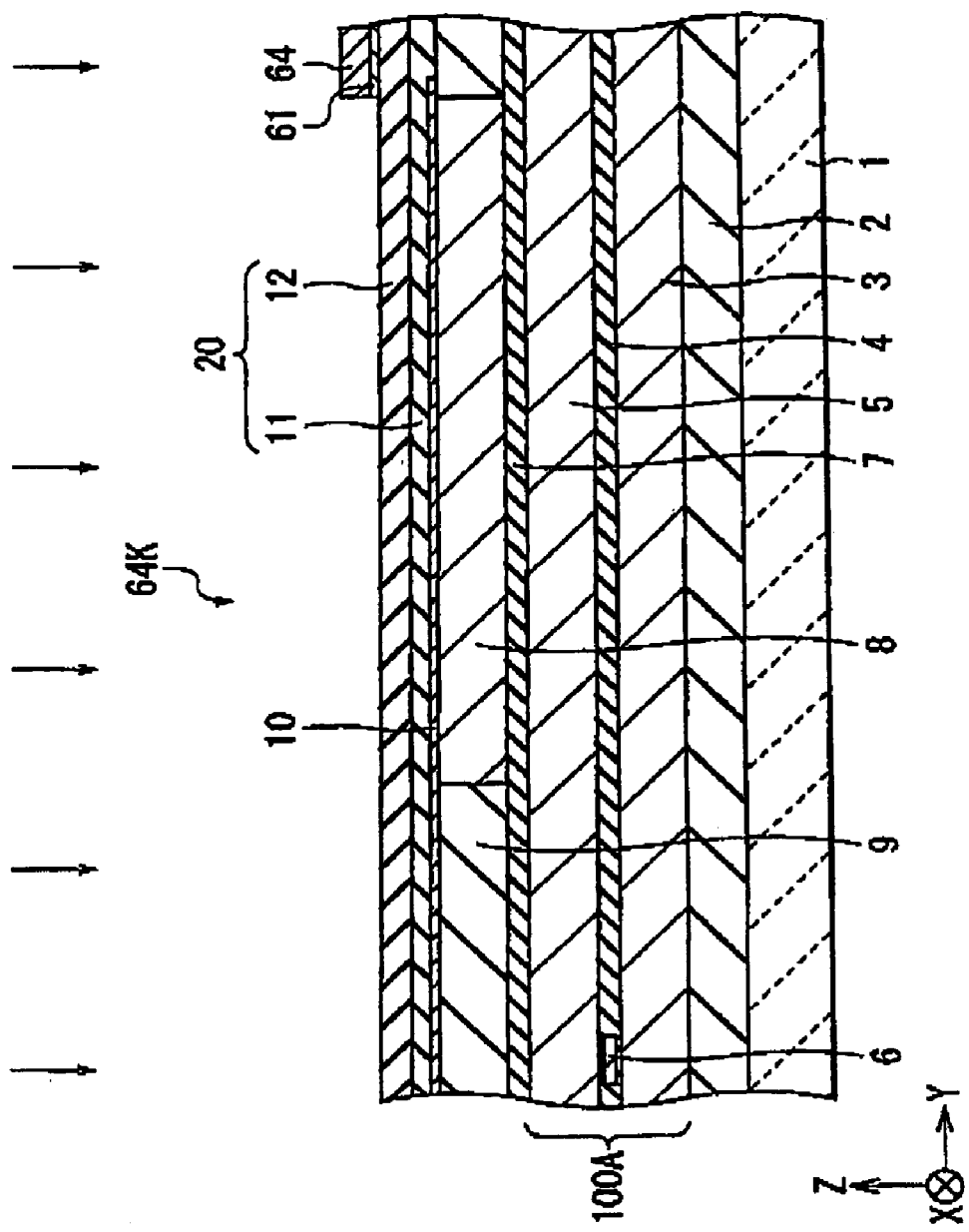
FIGS. 11A and 11B are cross sections showing a process subsequent to FIGS. 10A and 10B.
Figure 11A:
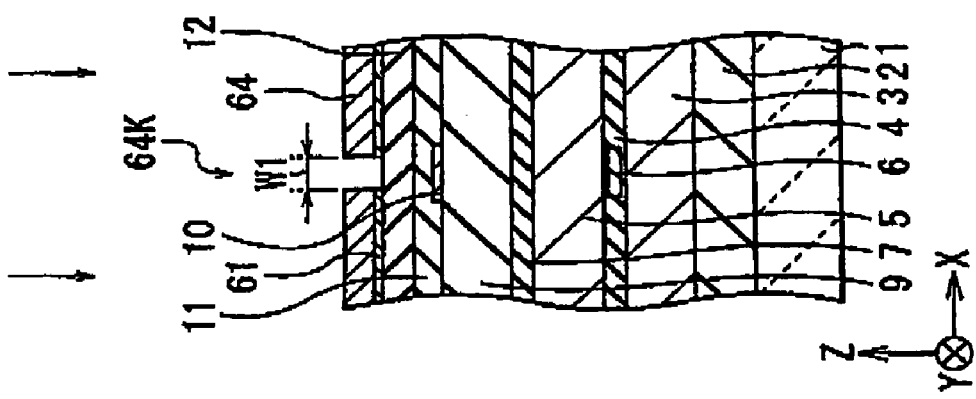

Subsequently, by using, for example, ion milling and etching the seed layer 61 through the opening 64K in the mask 64, as shown in FIGS. 11A and 11B, the part which is not covered with the mask 64, of the seed layer 61 is selectively removed to expose the upper insulating layer 12 to the opening 64K.

Figure 12B:
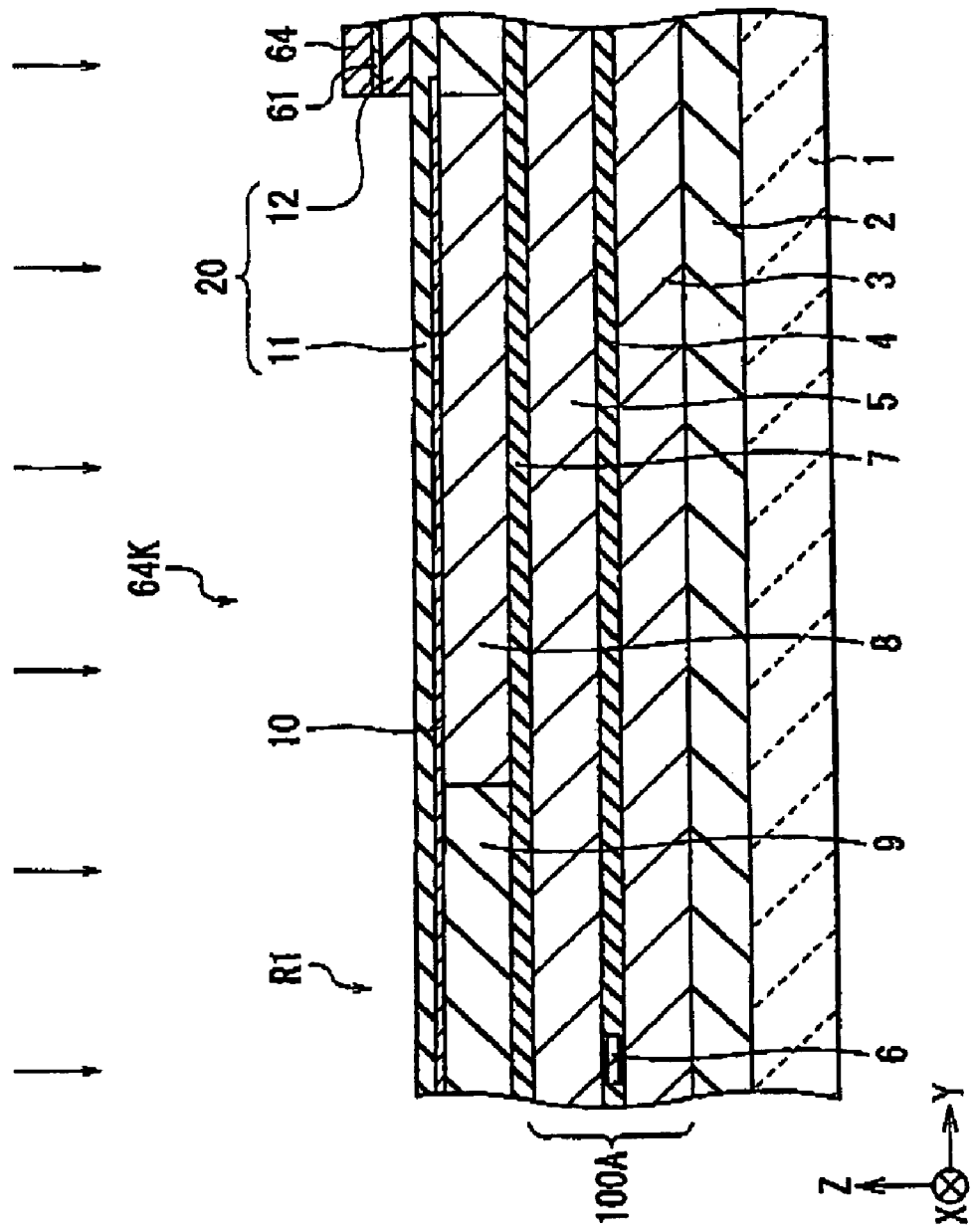
FIGS. 12A and 12B are cross sections showing a process subsequent to FIGS. 11A and 11B.
Figure 12A:
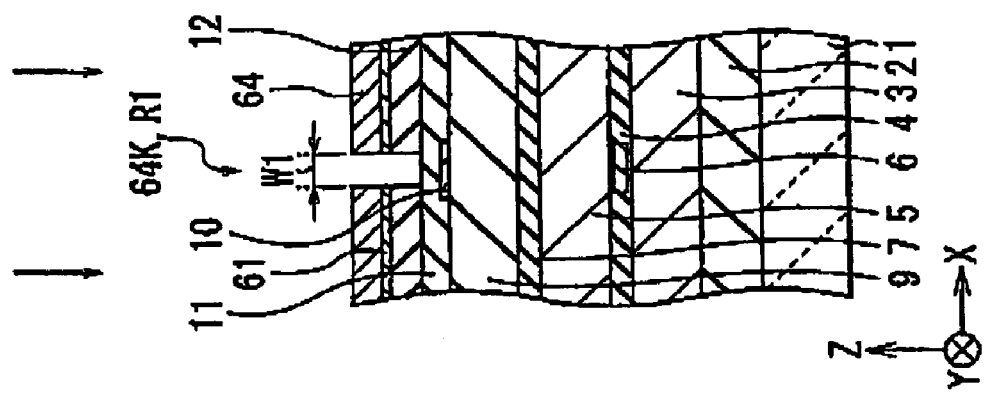

After that, the upper insulating layer 12 is selectively etched by the RIE until the lower insulating layer 11 is exposed via the opening 64K in the mask 64, thereby forming a magnetic pole formation space R1 (first magnetic pole formation space) so as to have the uniform width W1 in the upper insulating layer 12 as shown in FIGS. 12A and 12B. At the time of etching the upper insulating layer 12 by using the RIE, for example, a gas containing at least one of carbon tetrafluoride ($CF_4$) and trifluoromethane ($CHF_3$) or at least one of chlorine ($Cl_2$) and boron trichloride ($BCl_3$) is used as an etching gas. Concretely, a mixed gas of carbon tetrafluoride and trifluoromethane or a mixed gas of chlorine and boron trichloride is used. In the case of using a gas containing carbon tetrafluoride as an etching gas, for example, argon (Ar) or oxide ($O_2$) may be added to the carbon tetrafluoride. In the case of using a gas of this kind as the etching gas and etching the upper insulating layer 12 by the RIE, on the basis of the etching characteristic of the upper insulating layer 12 which is relatively easily etched (at a high etching rate), an etching process progresses almost at equal speed on the upper insulating layer 12. Consequently, the width of the magnetic pole formation space R1 formed in the upper insulating layer 12 becomes almost uniform (width W1) in the thickness direction as described above.

Figure 13B:
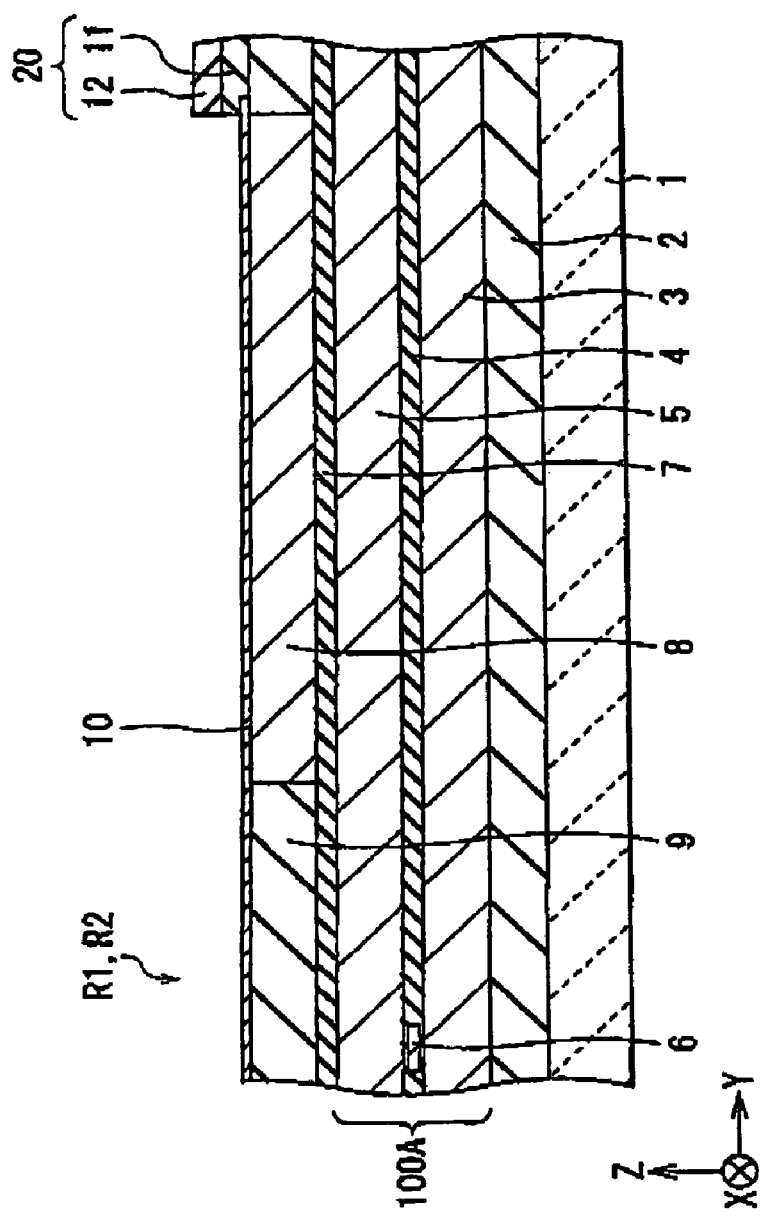
FIGS. 13A and 13B are cross sections showing a process subsequent to FIGS. 12A and 12B.
Figure 13A:
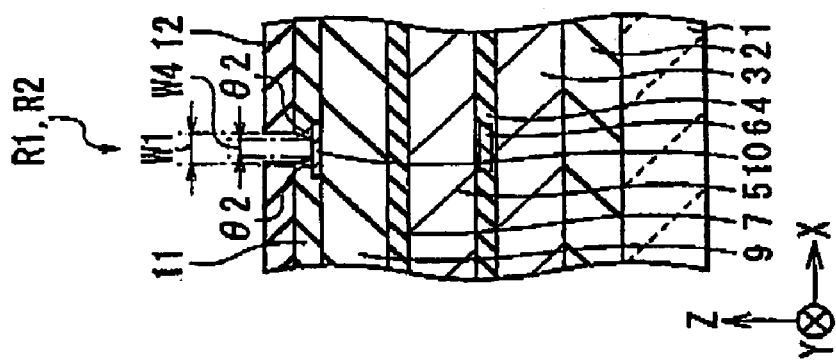

The seed layer 61 and mask 64 are removed by, for example, wet etching and the lower insulating layer 11 is selectively etched by the RIE until the stopper layer 10 is exposed via the magnetic pole layer formation space R1 formed in the upper insulating layer 12, thereby forming a magnetic pole formation space R2 (second magnetic pole formation space) in the lower insulating layer 11 so that the width gradually decreases with distance from the magnetic pole formation space R1 from the width W1 to the width W4 as shown in FIGS. 13A and 13B. At the time of etching the lower insulating layer 11 by using the RIE, for example, a gas of the same kid as that used in the case of etching the upper insulating layer 12 by using the RIM is used. Specifically, a gas containing at least one of carbon tetrafluoride ($CF_4$) and trifluoromethane ($CHF_3$) or at least one of chlorine ($Cl_2$) and boron trichloride ($BCl_3$) is used as an etching gas. Concretely, the same gas as that used in the case of etching the upper insulating layer 12 is used. In the case of using a gas of this kind as the etching gas and etching the lower insulating layer 11 by the RIE, different from the case of the upper insulating layer 12 having the etching characteristic that it is relatively easily etched, on the basis of the etching characteristic of the lower insulating layer 11 which is etched relatively difficult (at a low etching rate), the progress speed (seeming progress speed) of an etching process on the lower insulating layer 11 gradually decreases. Consequently, the width of the magnetic pole formation space R2 formed in the lower insulating layer 11 gradual decreases with distance from the magnetic pole formation space R1 from the width W1 to the width W4 as described above. In particular, in the case of etching the lower insulating layer 11 by the RIE, the stopper layer 10 performs the function of stopping progress of the etching process on the basis of the etching characteristic of the stopper layer 10 which is extremely difficult to be etched by the etching gas (the etching rate is extremely low), the etching process on the lower insulating layer 11 automatically stops at the time point when the stopper layer 10 is exposed due to formation of the magnetic pole formation space R2 in the lower insulating layer 11. An angle (taper angle) θ2 of the inner face (tapered face) of the lower insulating layer 11 constructing the magnetic pole formation space R2 from the horizontal line (X axis) determines a taper angle θ1 (refer to FIG. 4) of the main magnetic pole layer 13. The taper angle θ2 can be properly set on the basis of etching parameters used at the time of etching the lower insulating layer 11 by the RIE. The etching parameters are, for example, kind of gas, gas flow rate, source power, application bias or time (over-etching amount), and the lime.

Subsequently, by using the stopper layer 10 as a seed layer and growing a plating film in the magnetic pole formation spaces R1 and R2, the main magnetic pole layer 13 is formed in a pattern in the magnetic pole formation spaces R1 and R2 as shown in FIGS. 14A and 141. As the material of the main magnetic pole layer 13, for example, permalloy, iron-cobalt-based alloy, or the like is used. Concretely, as the iron-cobalt-based alloy, an iron cobalt alloy (FeCo), an iron cobalt nickel alloy (FeCoNi) or the like is used. At the time of forming the main magnetic pole layer 13, for example, the main magnetic pole layer 13 is not completely buried in the magnetic pole formation spaces R1 and R2. Specifically, the main magnetic pole layer 13 is formed in such a manner that the surface level of the main magnetic pole layer 13 is lower th that of the upper insulating layer 12.

Figure 15B:
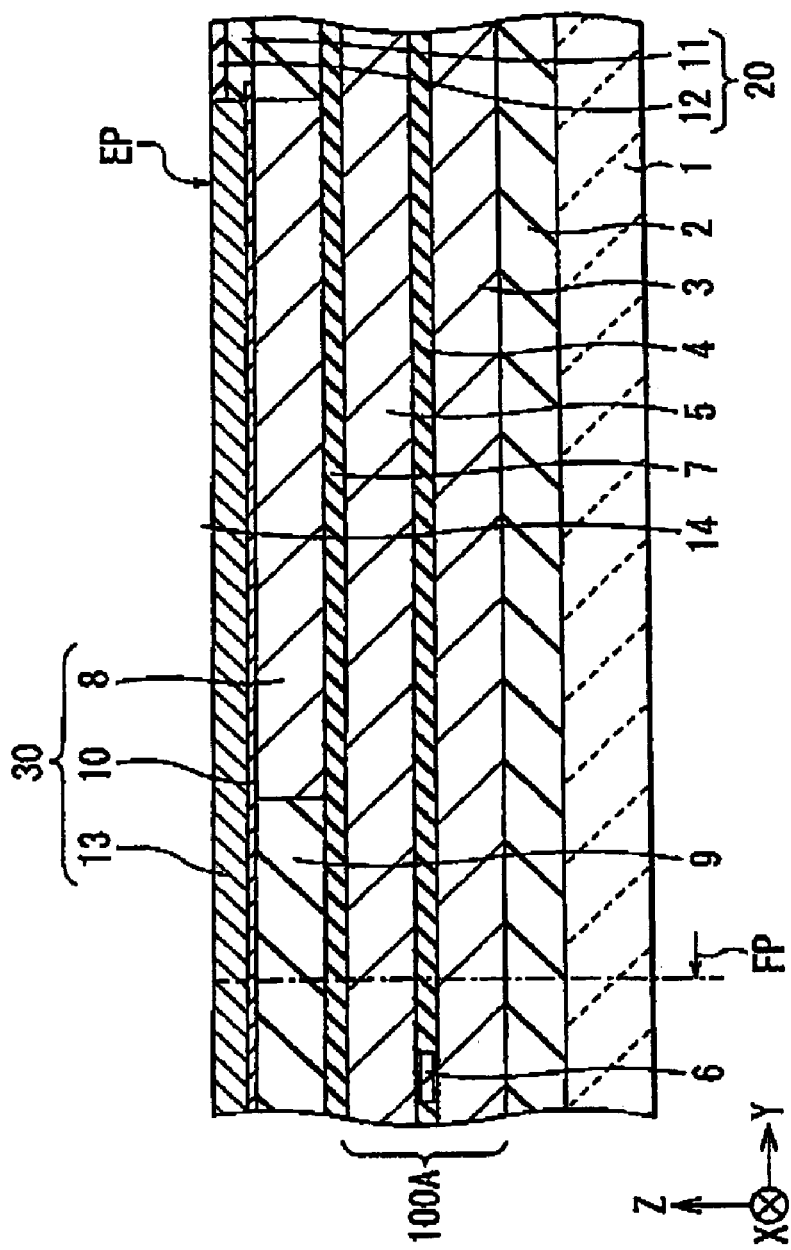
FIGS. 15A and 15B are cross sections showing a process subsequent to FIGS. 14A and 14B.
Figure 15A:
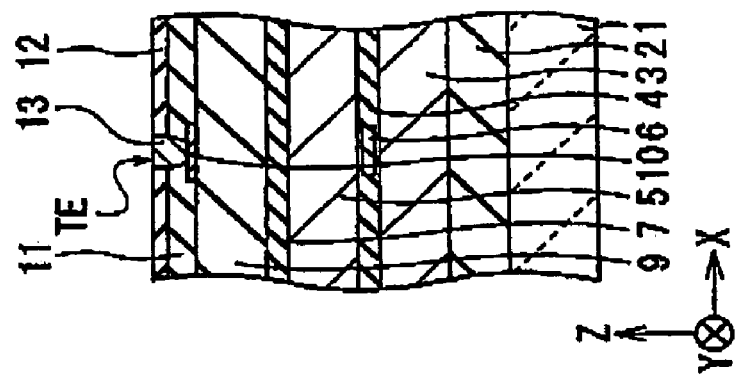

Finally, by polishing the main magnetic pole layer 13 and also the upper insulating layer 12 by, for example, CMP (Chemical Mechanical Polishing), the end face EP on the trailing side of the main magnetic pole layer 13 is planarized as shown in FIGS. 15A and 15B. Since the trailing edge TE is specified on the basis of the planarized end face EP by the polishing process, as shown in FIGS. 1A and 1B to FIG. 4, the magnetic pole layer 80 having the configuration in which the auxiliary magnetic pole layer 8, stopper layer 10, and main magnetic pole layer 13 are laminated in this order is completed. The structural characteristics of the magnetic pole formation spaces R1 and R2 formed in the lower and upper insulating layers 11 and 12 are reflected in the main magnetic pole layer 13. As shown in FIG. 3, the front end portion 13A includes: the upper front end portion 13A1 positioned on the trailing side and having the uniform width W1 in the thickness direction; and the lower front end portion 13A2 positioned on the leading side, magnetically coupled to the upper front end portion 13A1, and gradually narrowed from the width W1 to the width W4 with distance from the upper front end portion 13A1. The upper front end portion 13A1 and the lower front end portion 13A2 are integrated.

In the method of manufacturing the thin film magnetic head according to the embodiment, as shown in FIGS. 11A and 11B to FIGS. 15A and 15B, by etching the lower and upper insulating layers 11 and 12 by the RIB, the magnetic pole formation space R1 is formed so as to have the uniform width W1 in the upper insulating layer 12, and the magnetic pole formation space R2 is formed in the lower insulating layer 11 so as to be narrowed from the width W1 to the width W4 with distance from the magnetic pole formation space R1. After that, the main magnetic pole layer 13 is formed in the magnetic pole formation spaces R1 and R2. Consequently, the main magnetic pole layer 13 is formed in a process so as to include the front end portion 13A including: the upper front end portion 13A1 positioned on the trailing side and having the uniform width W1 in the thickness direction; and the lower front end portion 13A2 positioned on the leading side, magnetically coupled to the upper front end portion 13A1, and gradually narrowed from the width W1 to the width W4 with distance from the upper front end portion 13A1 and having a characteristic configuration that the upper front end portion 13A1 and the lower front end portion 13A2 are integrated. In this case, different from the conventional method of manufacturing a thin film magnetic head described in "Background of the Invention", specifically, the case of forming the main magnetic pole layer by two processes of separately forming a lower layer portion and an upper layer portion, the process of forming the main magnetic pole layer 13 is simplified and the number of processes for forming the main magnetic pole layer 13 decreases. Therefore, in the embodiment, the main magnetic pole layer 13 can be formed as simple as possible.

In particular, in the embodiment, the lower and upper insulating layers 11 and 12 are formed by using materials whose etching rates by RIB are different from each other. Concretely, the lower insulating layer 11 is formed by using a material such as alumina whose etching rate is relatively low, and the upper insulating layer 12 is formed by using a material such as silicon oxide whose etching rate is relatively high. After that, the lower and upper insulating layers 1 and 12 are selectively etched by RIE, thereby forming the magnetic pole formation spaces R1 and R2. Consequently, as described above, by using the etching characteristics which are different from each other, of the lower and upper insulating layers 11 and 12 (the difference between progress speeds of etching process), the magnetic pole formation space R1 is formed so as to have the uniform width W1, and the magnetic pole formation space R2 is formed so as to be gradually narrowed from the width W1 to the width W4 with distance from the magnetic pole formation space R1. That is, the magnetic pole formation spaces R1 and R2 are formed in the lower and upper insulating layers 11 and 12 so as to have the characteristic configuration in which the main magnetic pole layer 13 can be farmed. Moreover, in this case, the dimensions (widths W1 and W4) of the magnetic pole formation spaces R1 and R2 can be controlled with high precision on the basis of progress stability of the etching process by RIE, and the taper angle θ2 which determines the taper angle θ1 of the main magnetic pole layer 13 can be freely set by adjusting the etching conditions of RIE. Therefore, in the embodiment, the main magnetic pole layer 13 can be formed with high precision by using the magnetic pole spaces R1 and R2 formed in the lower and upper insulating layers 11 and 12.

In this case, particularly, as described above, on the basis of the points that the widths W1 and W4 can be controlled with high precision and the taper angle θ1 can be freely set, the shape of the magnetic pole end face XP of the main magnetic pole layer 13 can be controlled with high precision. Therefore, variations in the area of the magnetic pole end face XP of the main magnetic pole layer 13 are suppressed. As a result, variations in the recording magnetic field intensity can be suppressed when the thin film magnetic head operates.

In the embodiment, as shown in FIGS. 12A and 12B and FIGS. 13A and 13B, at the time of forming the magnetic pole formation space R2 by etching the lower insulating layer 11 by using RIE, progress of the etching process is stopped by using the stopper layer 10 so that, at the time point that the magnetic pole formation space R2 is formed in the lower insulating layer 11, progress of the etching process is automatically stopped. Therefore, different from the case where the stopper layer 10 is not used, the etching process can be prevented from progressing excessively to reach the insulating layer 9.

In this case, particularly, as shown in FIGS. 14A and 14B, at the time of forming the main magnetic pole layer 13 by growing a plating film, the stopper layer 10 is also used as a seed layer for growing the plating film, so that it is unnecessary to newly form a seed layer for forming the main magnetic pole layer 13. Therefore, also from this viewpoint, the invention can contribute to facilitate manufacture of the thin film magnetic head.

In the embodiment, in both of the process of forming the magnetic pole formation space R1 by etching the upper insulating layer 12 by using RIE and the process of forming the magnetic pole formation space R2 by etching the lower insulating layer 11 by similarly using RIE, the same gas is used as an etching gas. As compared with the case of using different gases, the labor required to prepare the gas at the time of performing the etching process by RIE can be omitted. Therefore, also from this viewpoint, the invention can contribute to facilitate manufacture of the thin film magnetic head.

In the embodiment, as shown in FIGS. 14A and 14B and FIGS. 15A and 15B, the main magnetic pole layer 13 is formed in the magnetic pole formation spaces R1 and R2 formed in the lower and upper insulating layers 11 and 12 and the main magnetic pole layer 13 is polished together with the upper insulating layer 12, thereby planarizing the end face EP on the trailing side of the main magnetic pole layer 13, so that the trailing edge TE of the main magnetic pole layer 13 is specified on the basis of the planarized end face EP. Therefore, the trailing edge TE as a substantial recording position in the main magnetic pole layer 13 can be planarized with high precision.

In this case, particularly, the front end portion 13A of the main magnetic pole layer 13 includes: the upper front end portion 13A1 positioned on the trailing side and having the uniform width W1; and the lower front end portion 13A2 positioned on the leading side and gradually narrowed from the width W1 to the width W4 with distance from the upper front end portion 13A1. As shown in FIG. 4, the magnetic pole end face XP of the main magnetic pole layer 13 has a hexagon shape as a whole, which is obtained by combining the rectangular region XP1 positioned on the trailing side and the inverted-trapezoid region XP2 positioned on the leading side. Consequently, different from the case where the magnetic pole end face XP has an inverted trapezoid shape as a whole, as long as the polishing amount of the main magnetic pole layer 13 is set to be within the range of the height H1 of the rectangular region XP1, the width of the trailing edge TE specifying the recording track width is always determined on the basis of the width W1 of the rectangular region XP1. Therefore, variations in the width of the trailing edge TE caused by variations in the polishing amount of the main magnetic pole layer 13 are suppressed. Also from this viewpoint, the invention can contribute to increase precision of manufacture of the thin film magnetic head.

In the embodiment, as shown in FIG. 4, FIGS. 6A and 6B, and FIGS. 15A and 15B, if the thickness (=about 0.015 μm to 0.3 μm) of the very small stopper layer 10 is not considered, the height H2 of the lower region XP2 in the magnetic pole end face XP of the main magnetic pole layer 13 is determined on the basis of the thickness T1 of the lower insulating layer 11. Therefore, the height H2 of the lower region XP2 can be controlled on the basis of the thickness T1 of the lower insulating layer 11.

In the embodiment, as shown in FIGS. 7A and 7B and FIGS. 8A and 8B, the photoresist pattern 62 having the corresponding portion 62A (width W01) is formed by using the photolithography process ad after that, by ashing the photoresist pattern 62, the width of the corresponding portion 62A is narrowed from the width W01 to the width W02 (W02<W01). Thus, the photoresist pattern 62 can be formed so as to have the very narrow width W02 which cannot be achieved by the photolithography process.

In this case, as shown in FIGS. 8A and 8B to FIGS. 10A and 10B, the photoresist pattern 62 having the corresponding portion 62A (width W02) is formed, the plating film 63 is formed so as to cover the photoresist pattern 62 and the seed layer 61 around the photoresist pattern 62, and the photoresist pattern 62 is lifted off, thereby forming the mask 64 having the opening 64K. As described above, consequently, the width of the corresponding portion 62A is narrowed from the width W02 to the width W1 (W1<W02) by using the pressure accompanying growth of the plating film 63. As a result, in the mask 64 formed finally, the width of the portion corresponding to the corresponding portion 62A in the opening 64K becomes the very narrow width W1 in correspondence with the width of the corresponding portion 62A. Moreover, as described above, the width of the corresponding portion 62A is almost uniformly narrowed by using the isotropic growth phenomenon of the plating film 63, so that the width W1 of the opening 64K becomes almost constant in the thickness direction. Therefore, the mask 64 can be formed with high precision so that the portion corresponding to the corresponding portion 62A in the opening 64K has the very narrow width W1 which cannot be achieved by the photolithography process.

In the embodiment, as shown in FIGS. 5A and 5B and FIGS. 15A and 15B, the main magnetic pole layer 13 is formed over the flat surface SP of the auxiliary magnetic pole layer 8 and the insulating layer 9 over the stopper layer 10, so that the end face on the leading side of the main magnetic pole layer 13 is also planarized by reflecting the flatness of the flat surface SP. Therefore, in addition to the end face EP on the trailing side of the main magnetic pole layer 13, the end face on the leading side can be also planarized. In this case, particularly, both of the end face EP on the trailing side of the main magnetic pole layer 13 and the end face on the leading side are planarized, so that the thickness of the main magnetic pole layer 13 can be controlled with high precision.

In the thin film magnetic head according to the embodiment, the front end portion 13A of the main magnetic pole layer 13 includes: the upper front end portion 13A1 positioned on the trailing side and having the uniform width W1 in the thickness direction; and the lower front end portion 13A2 positioned on the leading side, magnetically coupled to the upper fit end portion 13A1, and gradually narrowed from the width W1 to the width W4 with distance from the upper front end portion 13A1, and has the configuration that the upper and lower front end portions 13A1 and 13A2 are integrated. The insulating layer 20 formed in the periphery of the main magnetic pole layer 13 has the configuration in which the upper insulating layer 12 formed in the periphery of the upper front end portion 13A1 and the lower insulating layer 11 formed in the periphery of the lower front end portion 13A2 are laminated. To manufacture the thin film magnetic head including the main magnetic pole layer 13 and the insulating layer 20 which have these characteristic structures, the method of manufacturing a th film magnetic head of the invention can be applied.

In the embodiment, based on the characteristic configuration of the front end portion 13A, as shown in FIG. 4, the magnetic pole end face XP includes the rectangular region XP1 positioned on the trailing side and having the uniform width W1 and the inverted-trapezoid-shaped region XP2 positioned on the leading side and narrowed from the width W1 to the width W4 with distance from the rectangular region XP1. That is, the main magnetic pole layer 13 is constructed to have a hexagon shape as a whole in which the rectangular region XP1 and the inverted-trapezoid-shaped region XP2 are combined. Consequently, different from the case where the magnetic pole end face XP has a rectangular shape as a whole on the basis of the characteristic configuration of the magnetic pole end face XP including the inverted-trapezoid-shaped region XP, when the thin film magnetic head skews at the time of recording information, the recording pattern is not easily expanded or bent. Therefore, increase in the error rate caused by crosstalk on reproduction of information is suppressed, so that the recording performance of the thin film magnetic head can be improved.

In the embodiment, at the time of forming the main magnetic pole layer 13 in the magnetic pole formation spaces R1 and R2 provided in the lower and upper insulating layers 11 and 12, the main magnetic pole layer 13 is formed by growing the plating film. However, the invention is not always limited to the embodiment. For example, the main magnetic pole layer 13 may be formed by using sputtering. In this case as well effects similar to those of the foregoing embodiment can be obtained.

In the embodiment, in both of the process of forming the magnetic pole formation space R1 by etching the upper insulating layer 12 by using RIE and the process of forming the magnetic pole formation space R2 by etching the lower insulating layer 11 by similarly using RIE, the same gas is used as an etching gas. However, the invention is not always limited to the embodiment. For example, different gases may be used. In this case as well, effects similar to those of the embodiment can be obtained. As described above, from the viewpoint of facilitating the manufacturing process of the thin film magnetic head, it is preferable to use the same gas as the etching gas.

In the embodiment, at the time of forming the magnetic pole formation spaces R1 and R2 in the lower and upper insulating layers 11 and 12, the magnetic pole formation space R1 is formed by etching the upper insulating layer 12 by using RIE, the mask 64 is removed by using wet etching, and the lower insulating layer 11 is etched by using RIB, thereby forming the magnetic pole formation space R2. However, the invention is not limited to the embodiment.

For example, it is so possible to form the magnetic pole formation space R1 by etching the upper insulating layer 12 by using RIE, form the magnetic pole formation space R2 by etching the lower insulating layer 11 by using RIE, and remove the mask 64 by using wet etching. In this case, different from the embodiment in which the object to be etched has to be taken out from a chamber for etching to the atmospheric pressure between the two etching processes since the process of removing the mask 64 is performed between the process of etching the upper insulating layer 12 and the process of etching the lower insulating layer 11, the process of etching the upper insulating layer 12 and the process of etching the lower insulating layer 11 can be continuously performed in the chamber for etching, and it is unnecessary to take out the object to be etched from the chamber for etching between the two etching processes. Therefore, since the preparation work including preparation of the gas for etching is simplified, the main magnetic pole layer 13 can be formed more easily. In the case of removing the mask 64 after formation of the magnetic pole formation spaces R1 and R2, for example, at the time of removing the mask 64 by using wet etching, it is necessary to use different materials for the stopper layer 10 and the mask 64 or properly select the kind of an etchant so that the stopper layer 10 exposed through the magnetic pole formation spaces R1 and R2 is not removed together with the mask 64. In this case as well effects similar to those of the embodiment can be obtained.

The thin film magnetic head according to the embodiment of the invention has been described above.

Figure 16:
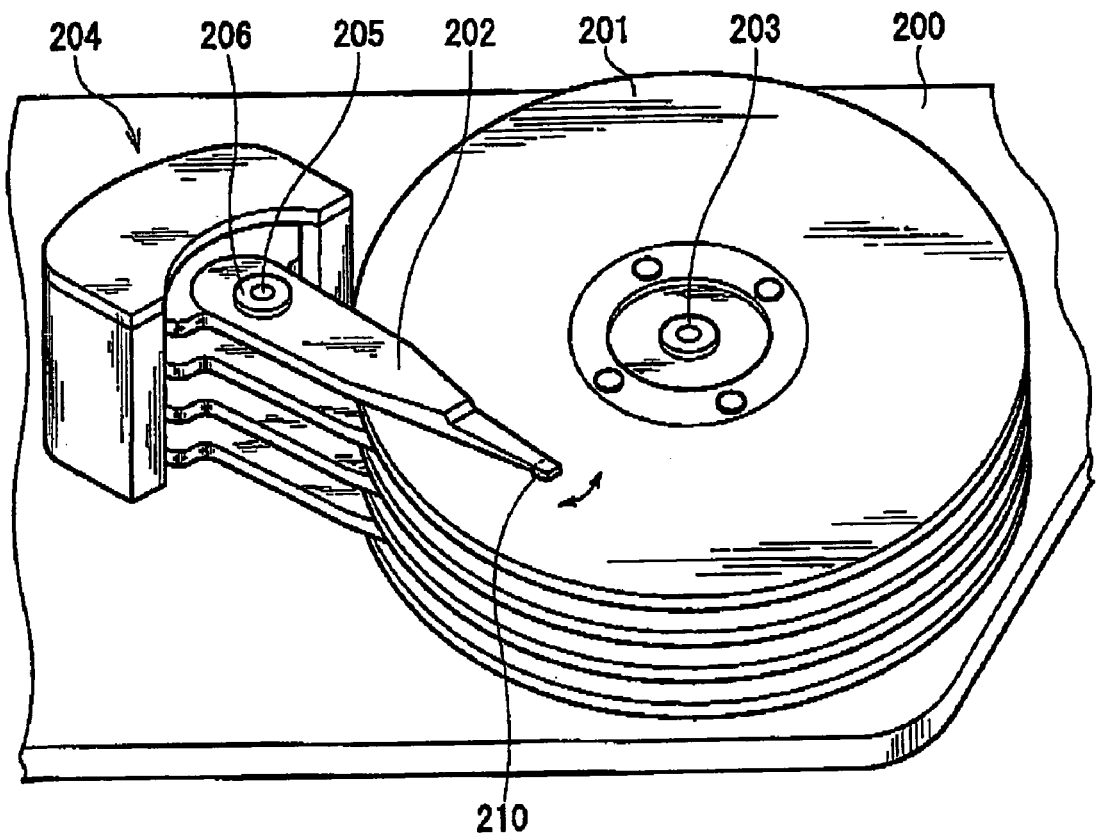
FIG. 16 is a perspective view showing a cutaway appearance configuration of a magnetic recording apparatus on which the thin film magnetic head of the invention is mounted.
Figure 17:
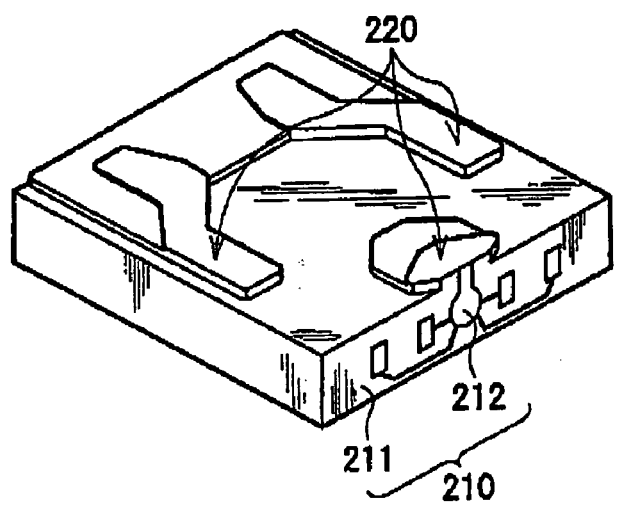
FIG. 17 is an enlarged perspective view of the appearance configuration of a main portion of the magnetic recording apparatus shown in FIG. 16.

Next, with reference to FIGS. 16 and 17, the configuration of a magnetic recording apparatus on which the thin film magnetic head of the invention is mounted will be described. FIG. 16 shows a cutaway configuration of the magnetic recording apparatus. FIG. 17 shows an enlarged configuration of a main portion of the magnetic recording apparatus. The magnetic recording apparatus is an apparatus on which the thin film magnetic head described in the foregoing embodiment is mounted and is, for example, a hard disk drive.

The magnetic recording apparatus has, as shown in FIG. 16, for example, in a casing 200, a plurality of magnetic disks (hard disks) 201 as recording media on which information is recorded and a plurality of arms 202 disposed in correspondence with the magnetic disks 201, each having a head slider attached to a tip thereof. The magnetic disk 201 is rotatable around a spindle motor 203 fixed to the casing 200 as a center. The arms 202 are connected to a driving unit 204 as a power source and are swingable via a bearing 206 around a fixed axis 205 fixed to the casing 200 as a center. The driving unit 204 includes, for example, a driving source such as a voice coil motor. FIG. 16 shows a model in which the plurality of arms 202 integrally swing around the fixed axis 205 as a center.

The head slider 210 has a configuration such that, as shown in FIG. 17, a thin film magnetic head 212 of the perpendicular recording method is provided in one side face (the surface on this side in FIG. 17) orthogonal to an air bearing surface 220, in a base body 211 having an almost rectangular parallelepiped shape including a rough surface (air bearing surface 220) for decreasing air resistance which occurs when the arm 202 swings. The thin film magnetic head 212 has, for example, the configuration described in the foregoing embodiment. FIG. 17 shows the upside down state of FIG. 16 so that the structure on the air bearing surface 220 side of the head slider 210 can be seen well.

Since the detailed configuration of the thin film magnetic head 212 has been already described in detail in the embodiment, it will not be repeated here.

In the magnetic recording apparatus, at the time of recording information, by the swing of the arm 202, the head slider 210 moves to a predetermined region (recording region) in the magnetic disk 201. When current is passed to the thin film magnetic head 212 in a state where the thin film magnetic head 212 faces the magnetic disk 201, by the operation described in the foregoing embodiment, the thin film magnetic head 212 records information onto the magnetic disk 201.

In the magnetic recording apparatus, the thin film magnetic head 212 of the invention is provided, so that the method of manufacturing the thin film magnetic head can be applied to manufacture of a magnetic recording apparatus on which the thin film magnetic head 212 is mounted.

The other configuration, operation, action, effect, modification, and the like of the thin film magnetic head 212 mounted on the magnetic recording apparatus are similar to those of the foregoing embodiments, so that their description will not be repeated.

Although the invention has been described above by the embodiment, the invention is not limited to the embodiment but can be variously modified. Concretely, for example, although the case of applying the invention to a shield-type head has been described in the foregoing embodiment, the invention is not always limited to the case but may be applied to a single magnetic pole type head. Although the case of applying the invention to a composite thin film magnetic head has been described in the foregoing embodiment, the invention is not always limited to the case but can be also applied to a thin film magnetic head dedicated to recording having an inductive magnetic transducer for writing and a thin film magnetic head having an inductive magnetic transducer for recording and reproduction. Obviously, the invention can be also applied to a thin film magnetic head of a structure in which the order of laminating an element for writing and an element for reading is reversed.

Although the case of applying the invention to the thin film magnetic head of the perpendicular recording method has been described in the embodiment, the invention is not always limited to the case but can be also applied to a thin film magnetic head of a longitudinal recording method.

The thin film magnetic head according to the invention, the method of manufacturing the same, and the magnetic recording apparatus can be applied to a hard disk drive for magnetically recording information onto a hard disk and the like.

Obviously many modifications and variations of the present invention are possible in the light of the above teachings. It is therefore to be understood that within the scope of the appended claims, the invention may be practiced otherwise than as specifically described.

What is claimed is:

1. A method of manufacturing a thin film magnetic head comprising:
   providing a thin film coil for generating a magnetic flux; and
   a magnetic pole layer extending rearward from a recording-medium-facing surface facing a recording medium traveling in a medium travel direction and having a magnetic pole portion which emits the magnetic flux generated by the thin film coil toward the recording medium,
   wherein a method of forming the magnetic pole portion in the magnetic pole layer includes:
   a first step of forming a first insulating layer on the medium travel direction and forming a second insulating layer on a direction opposite to the medium travel direction, thereby laminating the first and second insulating layers;
   a second step of patterning a mask having an opening corresponding to a shape in plan view of the magnetic pole portion, on the first insulating layer;
   a third step of forming a first magnetic pole formation space so as to have a uniform width, in the first insulating layer by selectively etching the first insulating layer by using reactive ion etching until the second insulating layer is exposed via the opening in the mask;
   a fourth step of forming a second magnetic pole formation space so as to have a width gradually narrowed with distance from the first magnetic pole formation space, in the second insulating layer by selectively etching the second insulating layer via the first magnetic pole formation space formed in the first insulating layer by using reactive ion etching; and
   a fifth step of forming the magnetic pole portion in the first and second magnetic pole formation spaces, and
   the magnetic pole portion is formed so as to include a first magnetic pole portion positioned on the medium travel direction and having the uniform width in the medium travel direction and a second magnetic pole portion positioned on the direction opposite to the medium travel direction, magnetically coupled to the first magnetic pole portion, and having the width gradually narrowed with distance from the first magnetic pole portion, and so as to have a configuration in which the first and second magnetic pole portions are integrated.

2. A method of forming a thin film magnetic head according to claim 1, wherein in the first step, the first insulating layer is formed by using a material whose etching rate in reactive ion etching is relatively high, and the second insulating layer is formed by using another material whose etching rate in reactive ion etching is relatively low.

3. A method of forming a thin film magnetic head according to claim 2, wherein the first insulating layer is formed by using silicon (Si), silicon nitride ($Si_3N_4$) or silicon oxide ($SiO_2$) and the second insulating layer is formed by using aluminum oxide ($Al_2O_3$).

4. A method of forming a thin film magnetic head according to claim 1, wherein in the third and fourth steps, reactive ion etching is performed by using a gas containing at least one of carbon tetrafluoride ($CF_4$) and trifluoromethane ($CHF_3$), or at least one of chlorine ($Cl_2$) and boron trichloride ($BCl_3$).

5. A method of manufacturing a thin film magnetic head according to claim 4, therein in the third and fourth steps, reactive ion etching is performed by using the same gas.

6. A method of manufacturing a thin film magnetic head according to claim 1, further comprising a sixth step of planarizing an end face on the medium travel direction side of the magnetic pole portion by polishing the magnetic pole portion together with the first insulating layer.

7. A method of manufacturing a thin film magnetic head according to claim 1, further comprising a seventh step of forming a stopper layer by using a non-magnetic metal material in a region corresponding to the shape in the plan view of the magnetic pole portion,
   wherein the first and second insulating layers are formed so as to cover the stopper layer in the first step, and the second insulating layer is etched until the stopper layer is exposed in the fourth step.

8. A method of manufacturing a thin film magnetic head according to claim 7, wherein the stopper layer is formed by using one of platinum (Pt), copper (Cu), gold (Au), palladium (Pd), rhodium (Rh), beryllium (Be), iridium (Ir), ruthenium (Ru), or any of alloys of those materials.

9. A method of manufacturing a thin film magnetic head according to claim 7, wherein in the fifth step, the magnetic pole portion is formed by growing a plating film by using the stopper layer as a seed layer.

10. A method of manufacturing a thin film magnetic head according to claim 1, wherein the second step includes:
- a step of forming a seed layer on the first insulating layer;
- a step of forming a photoresist pattern so as to have the shape in the plan view of the magnetic pole portion, on the seed layer;
- a step of growing a plating film so as to cover the photoresist pattern and the seed layer around the photoresist pattern by using the seed layer; and
- as step of forming the mask having the opening in a position in which the photoresist pattern was disposed by lifting off the photoresist pattern to make the plating film partially remain.

11. A method of manufacturing a thin film magnetic head according to claim 10, wherein the photoresist pattern is formed so that the magnetic pole portion has a first width, and is ashed, and a second width smaller than the first width.

12. A method of manufacturing a thin film magnetic head according to claim 11, wherein the mask is formed so that the opening has a third width corresponding to the magnetic pole portion and the third width is smaller than the second width by using compression accompanying growth of the plating film.

13. A method of manufacturing a thin film magnetic head according to claim 1, wherein the magnetic pole portion is formed so as to emit a magnetic flux for magnetizing the recording medium in a direction orthogonal to the surface of the recording medium.

* * * * *